US012472612B2

(12) United States Patent
Yoshikane et al.

(10) Patent No.: US 12,472,612 B2
(45) Date of Patent: Nov. 18, 2025

(54) ELECTRIC POWER TOOL

(71) Applicant: MAKITA CORPORATION, Anjo (JP)

(72) Inventors: Kiyonobu Yoshikane, Anjo (JP); Mizuki Yamamoto, Anjo (JP); Yoshitaka Machida, Anjo (JP); Yusuke Takano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/662,391

(22) Filed: May 13, 2024

(65) Prior Publication Data

US 2024/0391077 A1 Nov. 28, 2024

(30) Foreign Application Priority Data

May 24, 2023 (JP) ................................ 2023-085696
May 24, 2023 (JP) ................................ 2023-085697
May 24, 2023 (JP) ................................ 2023-085698

(51) Int. Cl.

*B25D 11/04* (2006.01)
*B25D 11/06* (2006.01)
*B25F 5/00* (2006.01)

(52) U.S. Cl.

CPC ............ *B25D 11/04* (2013.01); *B25D 11/062* (2013.01); *B25F 5/001* (2013.01); *B25D 2250/335* (2013.01)

(58) Field of Classification Search

CPC ....... B25F 5/001; B25D 11/04; B25D 16/006; B25D 11/062; B25D 2211/003; B25D 2216/0023; B25D 2216/0015; B25D 2250/335; B25D 2216/0038

See application file for complete search history.

(56) References Cited

U.S. PATENT DOCUMENTS 4,719,976 A * 1/1988 Bleicher .............. B25D 16/003 173/205
6,035,945 A * 3/2000 Ichijyou ................. B25D 16/00 173/48
6,192,996 B1 2/2001 Sakaguchi et al.

(Continued)

FOREIGN PATENT DOCUMENTS

JP 3688943 B2 8/2005
JP 5128391 B2 1/2013

*Primary Examiner* — Nathaniel C Chukwurah
(74) *Attorney, Agent, or Firm* — Oliff PLC

(57) ABSTRACT

A hammer drill includes a boss sleeve rotatably and externally mounted to an intermediate shaft separately from the intermediate shaft. The boss sleeve includes a rod coupled to a rear end of a piston cylinder via a swash bearing. The boss sleeve is configured to rotate to convert a rotation of the intermediate shaft into a reciprocating motion in a front-rear direction of the rod and transmit the reciprocating motion to the piston cylinder. The hammer drill includes a second clutch disposed at the intermediate shaft. By performing a switch operation of a slide position of the second clutch, a hammer mode in which the second clutch is engaged with the boss sleeve to reciprocate the piston cylinder back and forth and another operation mode are selectable. The boss sleeve is rotatably cantilevered not to be in contact with the intermediate shaft by an inner housing via a bearing.

16 Claims, 12 Drawing Sheets

(56) References Cited

U.S. PATENT DOCUMENTS

| | | | | |
|---|---|---|---|---|
| 6,666,284 | B2 * | 12/2003 | Stirm | B25D 16/006 173/104 |
| 7,591,324 | B2 * | 9/2009 | Saur | F16H 3/083 173/217 |
| 7,931,095 | B2 | 4/2011 | Machida et al. | |
| 2004/0003931 | A1 * | 1/2004 | Mueller | B25D 11/062 173/90 |
| 2010/0000748 | A1 | 1/2010 | Machida et al. | |
| 2021/0114195 | A1 * | 4/2021 | Yoshikane | B25D 11/10 |

* cited by examiner

ELECTRIC POWER TOOL

CROSS REFERENCE TO RELATED APPLICATION

This application claims the benefit of Japanese Patent Application Numbers 2023-085696, 2023-085697, and 2023-085698 filed on May 24, 2023, the entirety of which is incorporated by reference.

FIELD OF THE INVENTION

The disclosure relates to an electric power tool, such as a hammer drill.

BACKGROUND OF THE INVENTION

As disclosed in Japanese Patent No. 5128391, a hammer drill that includes a housing, a tool holder rotatably supported in a front space inside the housing, and a piston cylinder reciprocatably disposed in a rear space inside the tool holder. The tool holder has a front end configured to hold a bit, and an impactor configured to strike the bit is disposed inside the piston cylinder. A motor is disposed at the rear of the housing, and an intermediate shaft to which rotation is transmitted from an output shaft of the motor is pivotally supported to be parallel to an axis line of the tool holder. The intermediate shaft is provided with a gear and an impact transmission member, which are rotatably provided separately from the intermediate shaft. The gear rotates to transmit rotation of the intermediate shaft to the tool holder. The impact transmission member includes a rod coupled to a rear end of the piston cylinder, and rotates to convert the rotation of the intermediate shaft into a reciprocating motion in a front-rear direction and transmit it to the piston cylinder. Examples of the impact transmission member include a boss sleeve that supports the rod via a swash bearing having an inclined axis line. Between the gear and the impact transmission member, a clutch member configured to be integrally rotatable with the intermediate shaft and slidable in the front-rear direction is disposed.

By operating front and rear slide positions of the clutch member from the outside of the housing to engage/disengage the clutch member with/from the gear and/or the impact transmission member, an operation mode can be selected from a drill mode in which only the gear is caused to rotate so that the tool holder rotates; a hammer mode in which only the impact transmission member is caused to rotate so that the piston cylinder reciprocates; and a hammer drill mode in which both the gear and the impact transmission member are caused to rotate so that the tool holder rotates and the piston cylinder reciprocates simultaneously.

SUMMARY OF THE INVENTION

In the hammer drill as disclosed in Japanese Patent No. 5128391, when the drill mode is selected, the clutch member is not engaged with the impact transmission member. However, the impact transmission member possibly rotates due to a friction between an outer surface of the intermediate shaft and an inner surface of the impact transmission member and viscosity of a grease filled inside, thus unexpectedly causing an impacting motion.

Therefore, it is an object of the disclosure to provide an electric power tool capable of effectively suppressing an unexpected impacting motion in a drill mode in which a clutch member is not engaged with an impact transmission member.

To achieve the above-described object, the disclosure is an electric power tool including: a housing; a cylindrical tool holder pivotally supported to be rotatable in the housing, the tool holder extending in a front-rear direction and having a front end to which a bit is attachable; a piston cylinder housed to be movable back and forth in the tool holder; an impactor configured to strike the bit and disposed inside the piston cylinder; a motor disposed in the housing; at least one intermediate shaft pivotally supported to be parallel to an axis line of the tool holder in the housing, a rotation of the motor being transmitted to the intermediate shaft from a rotation shaft of the motor; a sleeve-shaped impact transmission member including a rod coupled to a rear end of the piston cylinder via a swing member that swings back and forth in accordance with a rotation of the intermediate shaft, the impact transmission member being configured to rotate to convert the rotation of the intermediate shaft into a reciprocating motion in the front-rear direction of the rod and transmit the reciprocating motion to the piston cylinder, the impact transmission member rotatably and externally mounted to the intermediate shaft separately from the intermediate shaft; and a clutch member disposed at the intermediate shaft, the clutch member being configured to be integrally rotatable with the intermediate shaft and slidable in the front-rear direction. By performing a switch operation of a slide position of the clutch member from an outside of the housing, a hammer mode in which the clutch member is engaged with the impact transmission member to reciprocate the piston cylinder back and forth and another operation mode in which the clutch member separates from the impact transmission member are selectable. The impact transmission member is rotatably cantilevered not to be in contact with the intermediate shaft by the housing via a bearing.

The disclosure can effectively suppress an unexpected impacting motion in the drill mode in which the clutch member is not engaged with the impact transmission member.

DETAILED DESCRIPTION OF THE INVENTION

Figure 1:
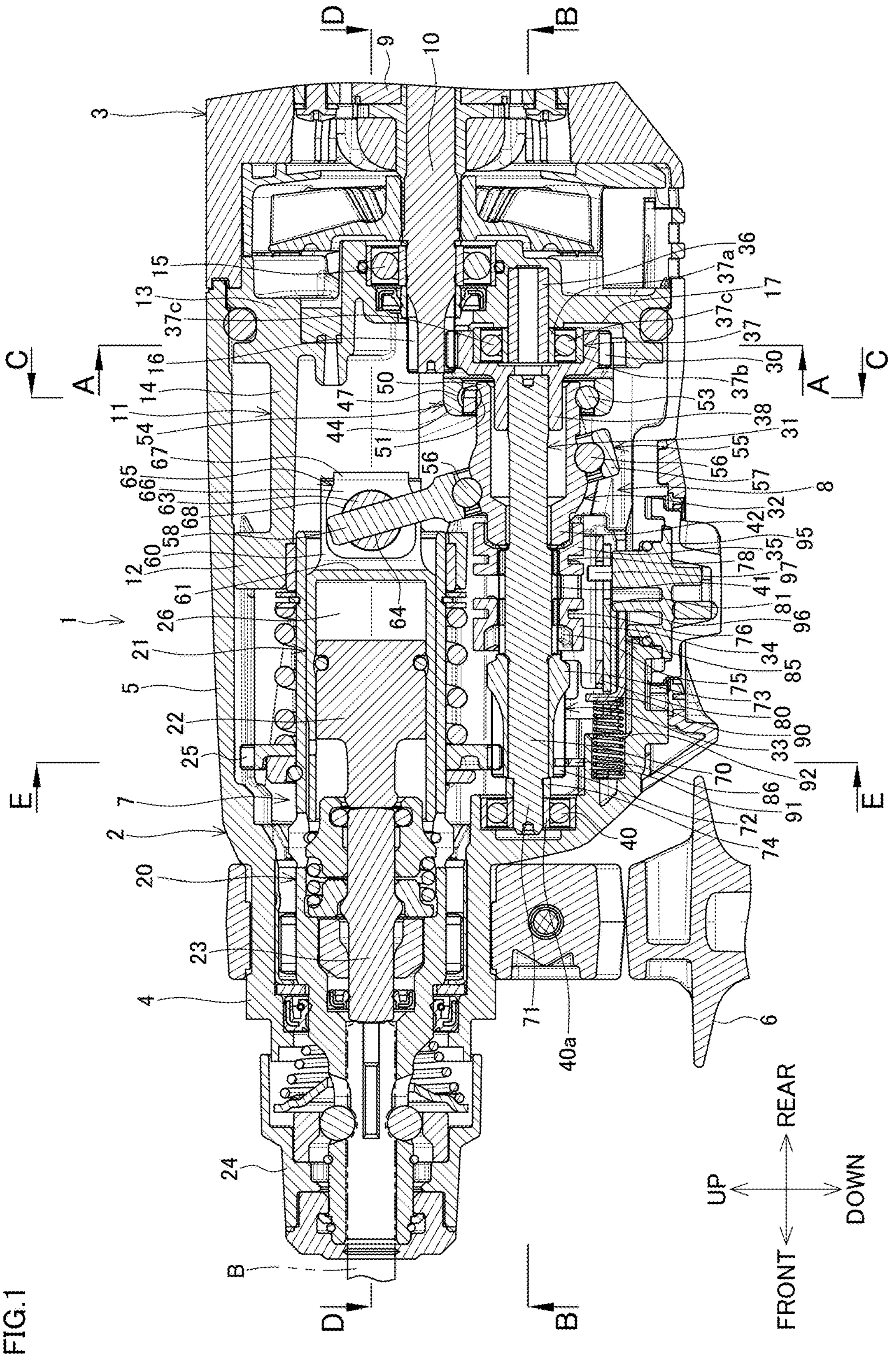
FIG. 1 is a center vertical cross-sectional view of a part of a hammer drill (hammer mode).

In one embodiment of the disclosure, a bearing may be disposed at a rear of a swing member, and may include an inner race, an outer race, and a rolling body between the inner race and the outer race. The outer race may be supported by a housing.

The configuration facilitates cantilever supporting of an impact transmission member by the housing.

In one embodiment of the disclosure, the inner race may be integrally formed with the impact transmission member.

The configuration provide a rational configuration in which the inner race doubles as the impact transmission member, and the number of components can be reduced even when the bearing is disposed.

In one embodiment of the disclosure, an intermediate shaft may be pivotally supported by a front bearing and a rear bearing held by the housing at a front and a rear of the swing member.

The configuration allows accurately supporting the intermediate shaft to be parallel to the tool holder.

In one embodiment of the disclosure, the intermediate shaft may include an input gear that is meshed with a pinion provided to a rotation shaft and supported by the rear bearing, and the input gear and the rear bearing may be located on an identical plane perpendicular to an axis line of the intermediate shaft.

The configuration makes positions of the input gear and the rear bearing in the front-rear direction same, and the input gear and the rear bearing are compactly arranged in the front-rear direction.

In one embodiment of the disclosure, the outer race may be supported by the housing via a support member assembled to the housing, the support member may include a positioning portion coupled to the housing by spigot joint, and the positioning portion also may be located on the plane identical to the input gear and the rear bearing.

With the configuration, even when the support member that cantilevers the impact transmission member is provided, downsizing in the front-rear direction can be maintained.

In one embodiment of the disclosure, the rear bearing may include an inner race, an outer race, and a rolling body between the inner race and the outer race, and the inner race of the rear bearing may be supported by the housing.

With the configuration, even when the rear bearing and the input gear are disposed on an identical plane, the housing can support the rear bearing.

In one embodiment of the disclosure, the inner race of the rear bearing may be supported by the housing via a pin member press-fitted into the housing.

With the configuration, the rear bearing inside the input gear can be easily assembled to the housing.

In one embodiment of the disclosure, the intermediate shaft may be coupled to the input gear in a radially inside of the impact transmission member.

With the configuration, the intermediate shaft can be coupled to the input gear without interference with the bearing that cantilevers the impact transmission member.

In one embodiment of the disclosure, an engaging portion engaged with a clutch member may be disposed in a front end outside of the impact transmission member.

With the configuration, the impact transmission member can be engaged with and disengaged from the clutch member without an obstacle even when the impact transmission member is cantilevered.

The following describes embodiments of the disclosure by referring to the drawings.

FIG. 1 is a center vertical cross-sectional view illustrating an exemplary hammer drill as an electric power tool and an impact tool. FIG. 1 illustrates only a front side portion in a hammer mode.

A hammer drill 1 includes a front housing 2 and a rear housing 3. The front housing 2 includes a front cylinder portion 4 and a rear cylinder portion 5. The front cylinder portion 4 extends forward and has a cylindrical shape having a circular lateral cross-sectional surface. The rear cylinder portion 5 has a cylindrical shape in a vertically elongated quadrangular shape in front view having dimensions in left-right and up-down directions larger than those of the front cylinder portion 4. The front cylinder portion 4 is disposed adjacent to an upper portion of the rear cylinder portion 5. A side handle 6 is removably attachable to the front cylinder portion 4.

The front housing 2 internally includes a rotation/impact unit 7 and an output switching unit 8. The rear housing 3 includes a motor 9. The motor 9 is housed in the rear housing 3 in a posture having a rotation shaft 10 facing front.

A power supply cord (not illustrated) is connected to the rear housing 3. The rear housing 3 includes a switch with a trigger (not illustrated).

Figure 2:
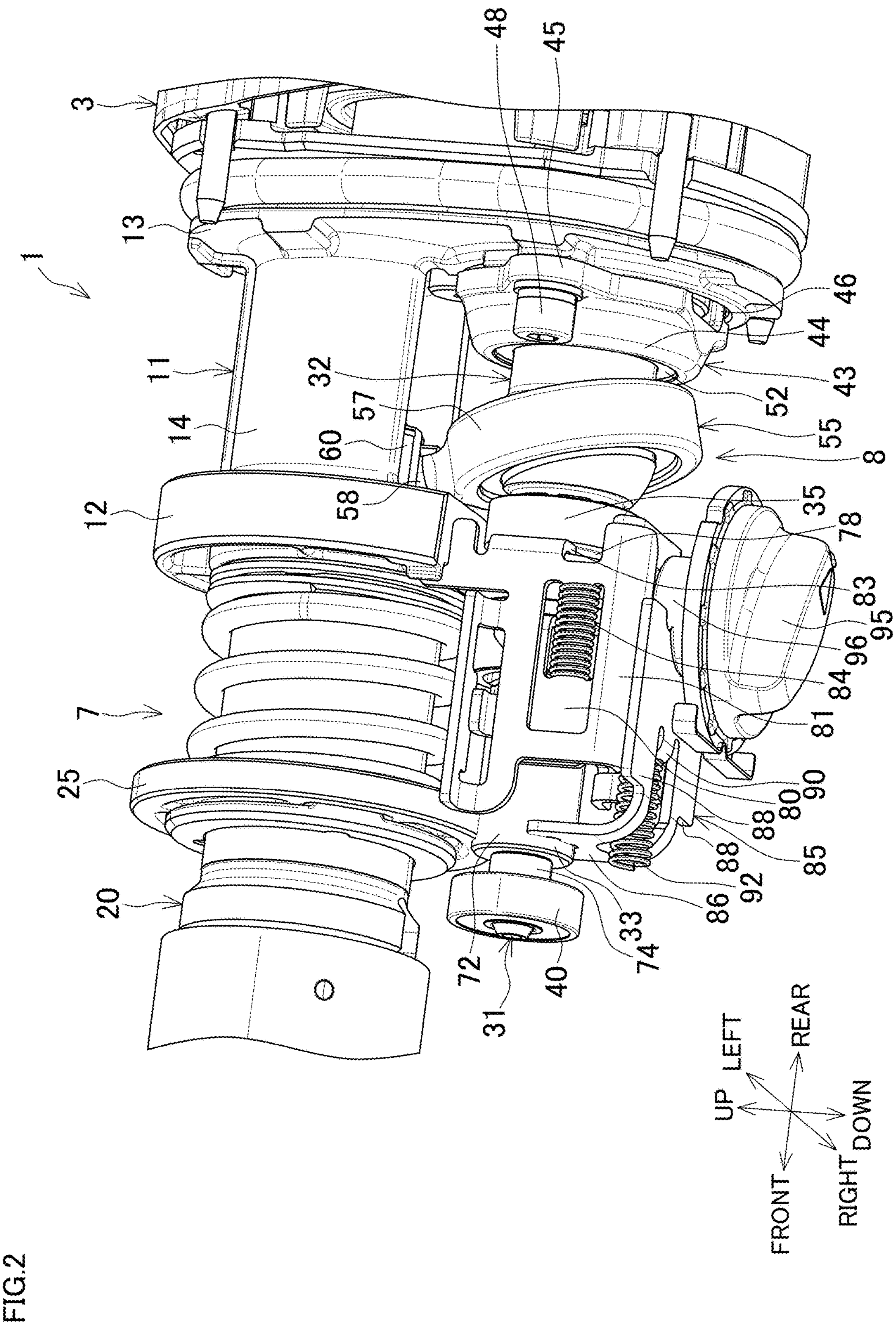
FIG. 2 is a perspective view of a front part of the hammer drill in which a front housing is omitted viewed from lower side.
Figure 3:
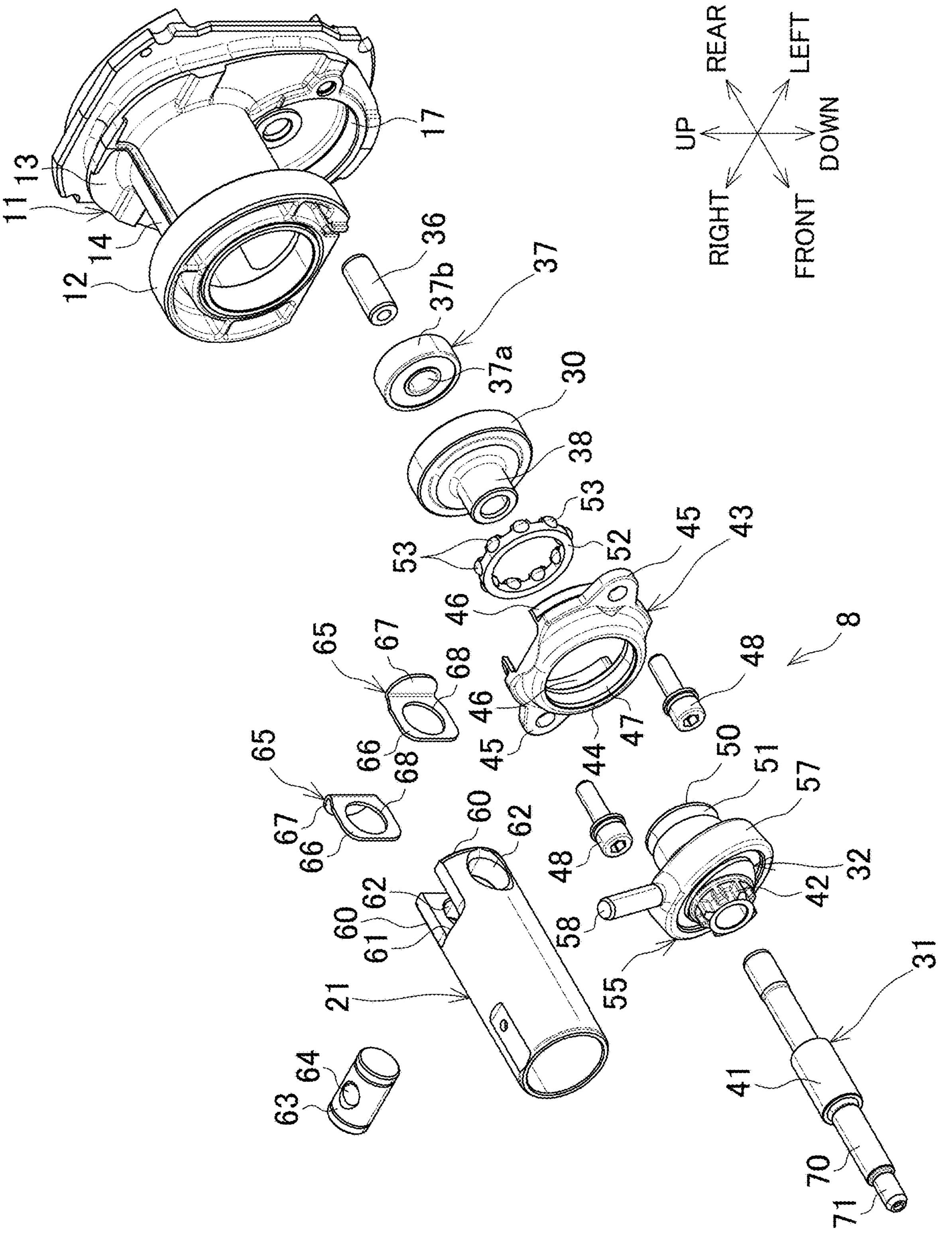
FIG. 3 is an exploded perspective view of a rear side of an output switching unit.

The front housing 2 includes an inner housing 11. The inner housing 11 is housed in the rear cylinder portion 5, and as also illustrated in FIG. 2 and FIG. 3, includes a front holder 12, a rear holder 13, and a coupling portion 14. The front holder 12 is positioned in the upper side of the rear cylinder portion 5 at approximately the center in the front-rear direction, and holds a tool holder 20 described later. The rear holder 13 has a plate shape fitted to a rear end of the rear cylinder portion 5, and holds the rotation shaft 10 penetrating the center portion via a bearing 15. At a front end of the rotation shaft 10, a pinion 16 projecting into the rear cylinder portion 5 is disposed. At a front surface of the rear holder 13 below the rotation shaft 10, a circular depressed portion 17 is provided. The coupling portion 14 extends in the front-rear direction and has a semi-cylindrical shape having an open lower face, and couples the front holder 12 to the rear holder 13.

The rotation/impact unit 7 includes the tool holder 20, a piston cylinder 21, a striker 22, and an impact bolt 23. The tool holder 20 has a cylindrical shape having an axis line extending in the front-rear direction. The tool holder 20 is coaxially housed in the front cylinder portion 4, and rotatably held by the front cylinder portion 4 and the front holder 12 of the inner housing 11. The tool holder 20 has a front end projecting forward from the front cylinder portion 4. At the front end of the tool holder 20, an operation sleeve 24 is provided. The operation sleeve 24 is provided for attaching and removing operations of a bit B at the front end of the tool holder 20. A gear 25 configured to be integrally rotated with the tool holder 20 is externally mounted to the tool holder 20 inside the rear cylinder portion 5.

The piston cylinder 21 has an open front end, and housed to be movable back and forth at a rear of the tool holder 20.

The striker 22 is housed to be movable back and forth in the piston cylinder 21 with an air chamber 26. The impact bolt 23 is housed to be movable back and forth ahead of the striker 22 in the tool holder 20.

Figure 4:
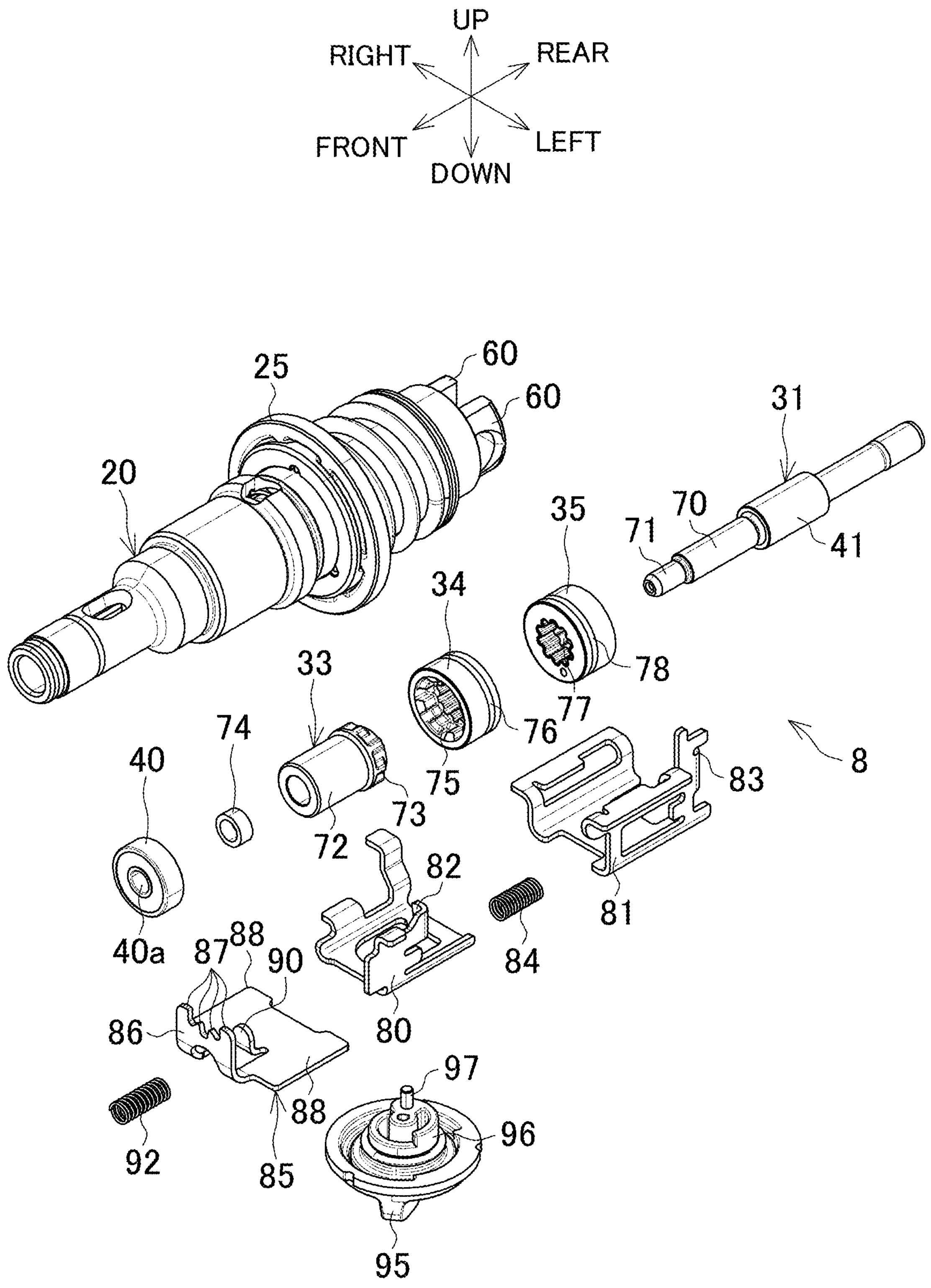
FIG. 4 is an exploded perspective view of a front side of the output switching unit.

As illustrated in FIG. 3 and FIG. 4, the output switching unit 8 includes an input gear 30, an intermediate shaft 31, a boss sleeve 32, an output gear 33, a first clutch 34, and a second clutch 35.

Figure 5:
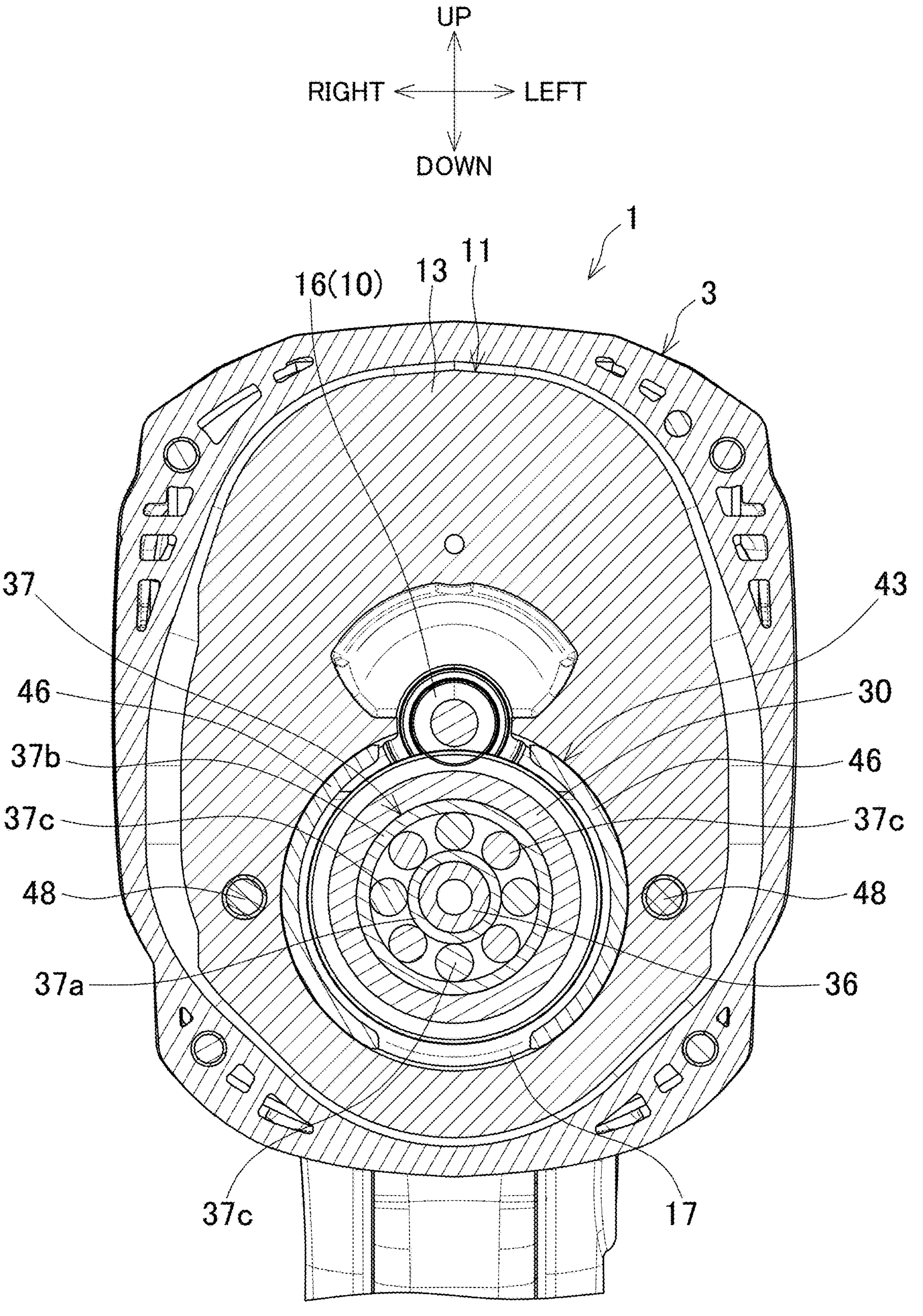
FIG. 5 is an enlarged cross-sectional view taken along a line A-A of FIG. 1.

The input gear 30 is disposed below the pinion 16. The input gear 30 has a cap shape having an opening in the rear side, and is provided with external teeth on an outer periphery, which are meshed with the pinion 16. At the center of the circular depressed portion 17 provided to the rear holder 13, a cylindrical pin 36 is press-fitted to be parallel to the rotation shaft 10, and projects forward. The input gear 30 is disposed to be coaxially with the pin 36 in the circular depressed portion 17. Between the input gear 30 and the pin 36, a rear bearing 37, which is a ball bearing, is interposed. The rear bearing 37 includes an inner race 37*a*, an outer race 37*b*, and a plurality of balls 37*c*, 37*c*, . . . disposed between the inner race 37*a* and the outer race 37*b*. The inner race 37*a* is supported by the pin 36, and the outer race 37*b* is supported by the input gear 30. As illustrated in FIG. 5, the input gear 30 and the rear bearing 37 are arranged on an identical plane perpendicular to the pin 36. In other words, the input gear 30 and the rear bearing 37 are arranged on a concentric circle having the pin 36 in the center, and overlapped to one another in a radial direction of the pin 36. On a front surface of the input gear 30, a receiving cylinder portion 38 having a small diameter is coaxially formed to face forward.

The intermediate shaft 31 is disposed below the tool holder 20 such that axis lines of the intermediate shaft 31 and the tool holder 20 become parallel to one another. The intermediate shaft 31 has a front end supported via a front bearing 40 that is a ball bearing held by a front inner surface of the rear cylinder portion 5. The intermediate shaft 31 has a rear end press-fitted to the receiving cylinder portion 38 of the input gear 30, and integrally coupled with the input gear 30. At a center portion in the front-rear direction of the intermediate shaft 31, a spline 41 is provided.

The boss sleeve 32 is disposed at a rear of the spline 41, and the intermediate shaft 31 coaxially penetrates the boss sleeve 32. On an outer periphery of a front end of the boss sleeve 32, a boss side engaging portion 42 including a plurality of external teeth in a circumferential direction is formed. The receiving cylinder portion 38 of the input gear 30 is coaxially and movably inserted into a rear end of the boss sleeve 32.

Figure 6:
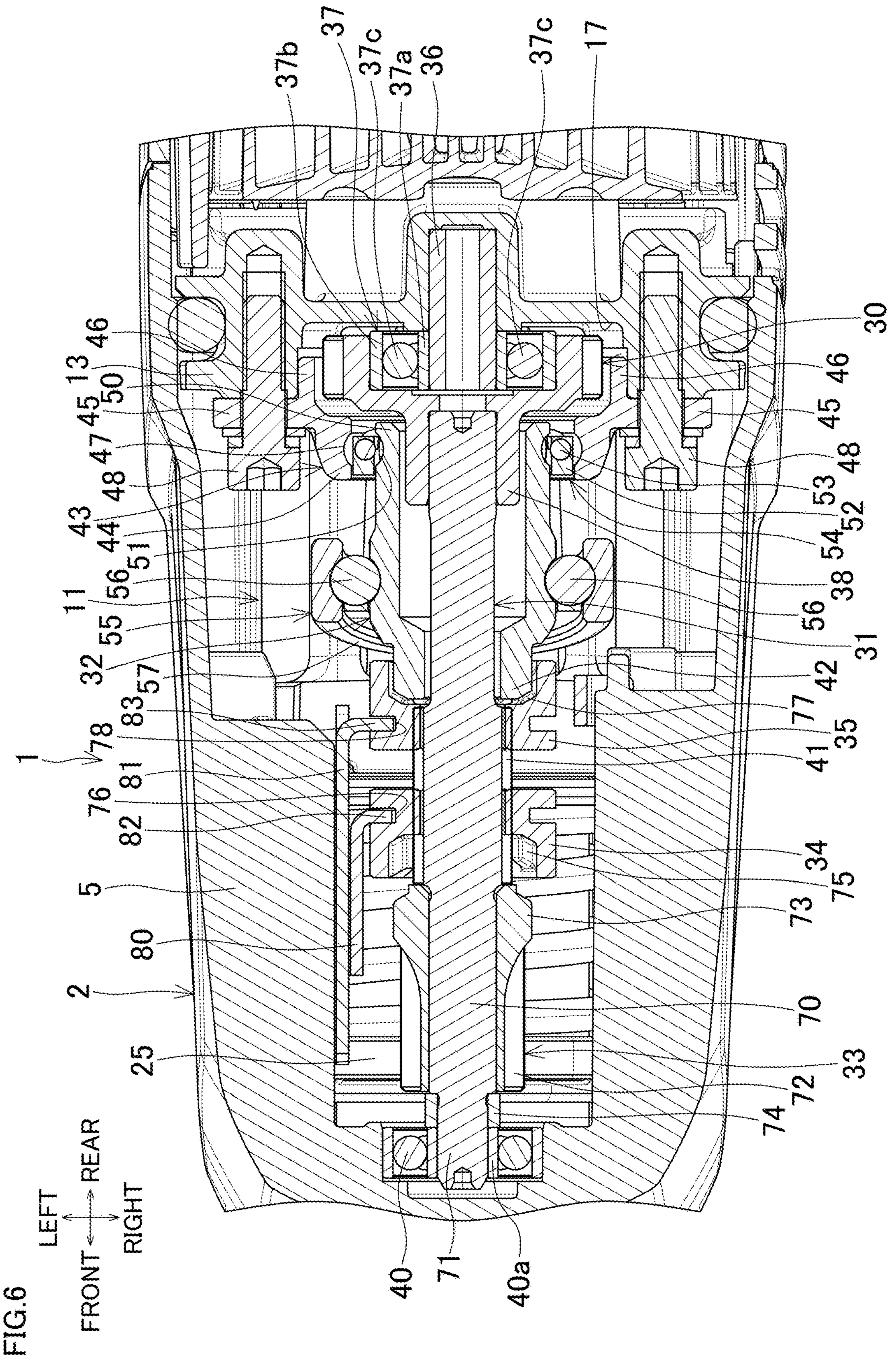
FIG. 6 is an enlarged cross-sectional view taken along a line B-B of FIG. 1.

A support ring 43 is secured to a front surface of the rear holder 13 of the inner housing 11. The support ring 43 includes an outer race portion 44, a pair of right and left installation pieces 45, 45, and a pair of right and left spigot joint portions 46, 46. The outer race portion 44 is formed at a front end of the support ring 43, and the rear end of the boss sleeve 32 is coaxially and movably inserted into the outer race portion 44. At an inner peripheral surface of the outer race portion 44, a ring-shaped outer groove 47 is provided. As illustrated in FIG. 6, the installation pieces 45, 45 are secured to both right and lefts of the circular depressed portion 17 from the front side with a pair of right and left bolts 48, 48. Accordingly, the support ring 43 is secured coaxially with the circular depressed portion 17. The spigot joint portions 46, 46 project rearward from a rear end of the support ring 43 in an arc shape in back view, and fitted to an inner circumference of the circular depressed portion 17 in a secured state of the support ring 43 as illustrated in FIG. 5. The spigot joint portions 46, 46 are located in a radially outside of the input gear 30, and located on an identical plane perpendicular to the pin 36.

Figure 7:
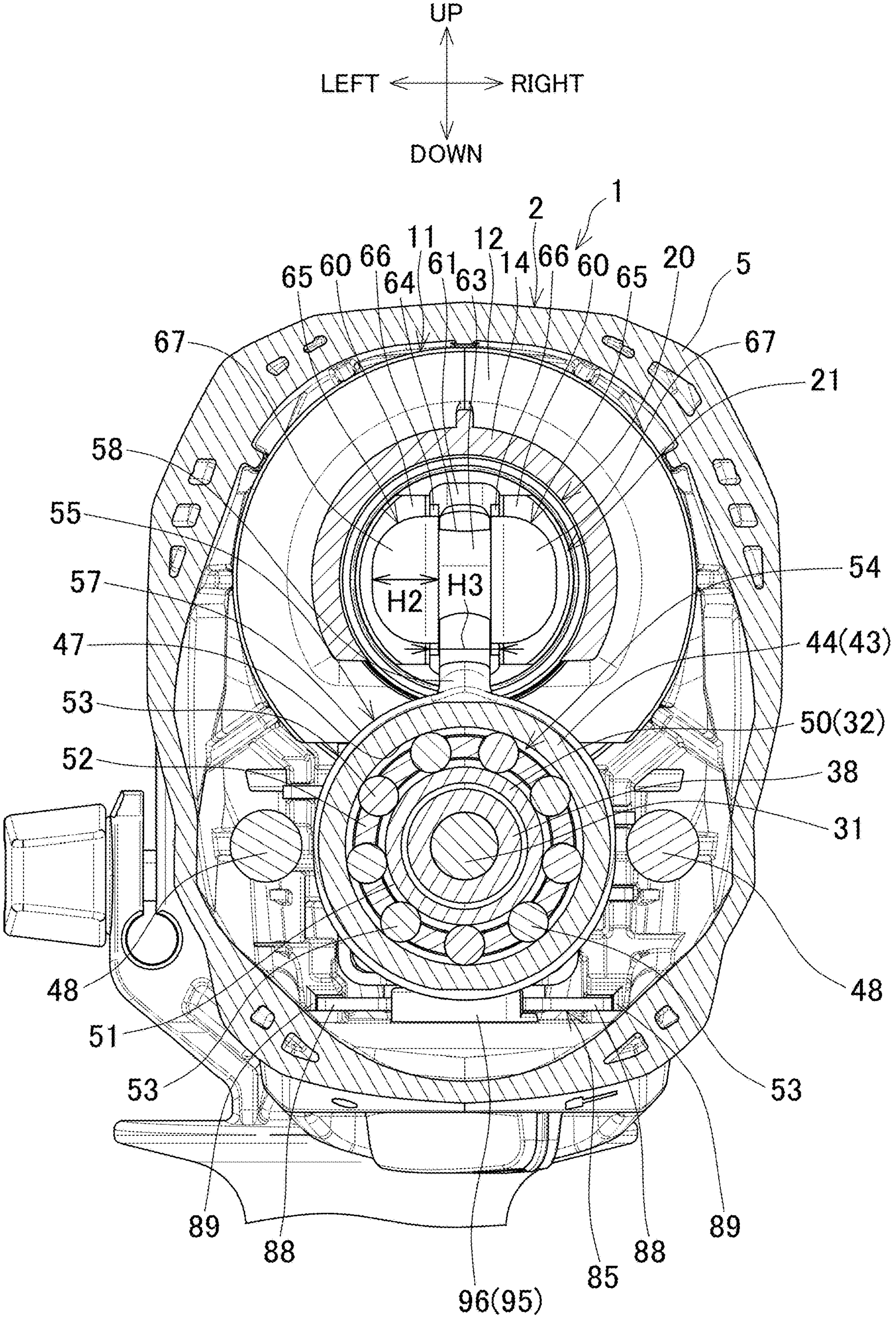
FIG. 7 is an enlarged cross-sectional view taken along a line C-C of FIG. 1.

At the rear end of the boss sleeve 32, an inner race portion 50 is formed. At an outer peripheral surface of the inner race portion 50, a ring-shaped inner groove 51 is formed. The inner groove 51 is radially opposed to the outer groove 47 provided at the outer race portion 44 of the support ring 43. Between the inner groove 51 and the outer groove 47, a plurality of balls 53, 53, . . . held by a retaining ring 52 at regular intervals in a circumferential direction are disposed. Specifically, between the support ring 43 and the boss sleeve 32, a bearing 54 that is a ball bearing including the outer race portion 44, the inner race portion 50, and the balls 53 is integrally formed. Accordingly, the boss sleeve 32 is cantilevered by the rear holder 13 via the support ring 43, and rotatably supported via the bearing 54. In this state, the inner peripheral surface of the boss sleeve 32 is not in contact with the intermediate shaft 31 or an outer peripheral surface of the receiving cylinder portion 38 as illustrated in FIG. 1 and FIG. 7.

A bulge portion is provided on an outer periphery of the boss sleeve 32 between the boss side engaging portion 42 and the bearing 54, and a swash bearing 55 is disposed at the bulge portion. The swash bearing 55 is disposed to have its axis line inclined from an axis line of the boss sleeve 32. The swash bearing 55 includes a plurality of balls 56, 56, . . . and an outer ring 57. The balls 56 are disposed at regular intervals on the outer peripheral surface of the boss sleeve 32. The outer ring 57 is externally mounted outside the balls 56. The outer ring 57 is provided with a rod 58. The rod 58 has a stick shape having a circular lateral cross-sectional surface, projects outward in a radial direction of the outer ring 57, and extends upward.

At a rear end of the piston cylinder 21, a pair of rod coupling portions 60, 60 are formed in approximately semi-circular shapes of left-right symmetry in back view. Between the rod coupling portions 60, 60, a groove 61 is provided in an up-down direction with open top, bottom, and rear faces.

The rod coupling portions 60, 60 are provided with through-holes 62, 62 that penetrate in the left-right direction and have circular shapes in side view. A coupling pin 63 is rotatably inserted through the through-holes 62, 62. The coupling pin 63 is provided with a coupling hole 64 penetrating in a radial direction. The rod 58 penetrates the coupling hole 64 from the lower side passing through the groove 61. Accordingly, the rod 58 is coupled to the rod coupling portions 60, 60 via the coupling pin 63 so as to be swingable in the front-rear direction and relatively slidable in the axial direction inside the coupling hole 64.

Figure 8B:
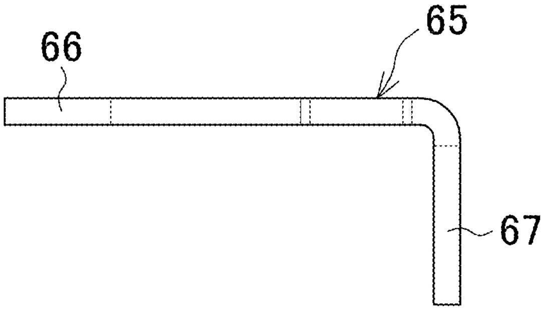
FIG. 8B is an explanatory view of the sheet metal member in plan view.
Figure 8A:
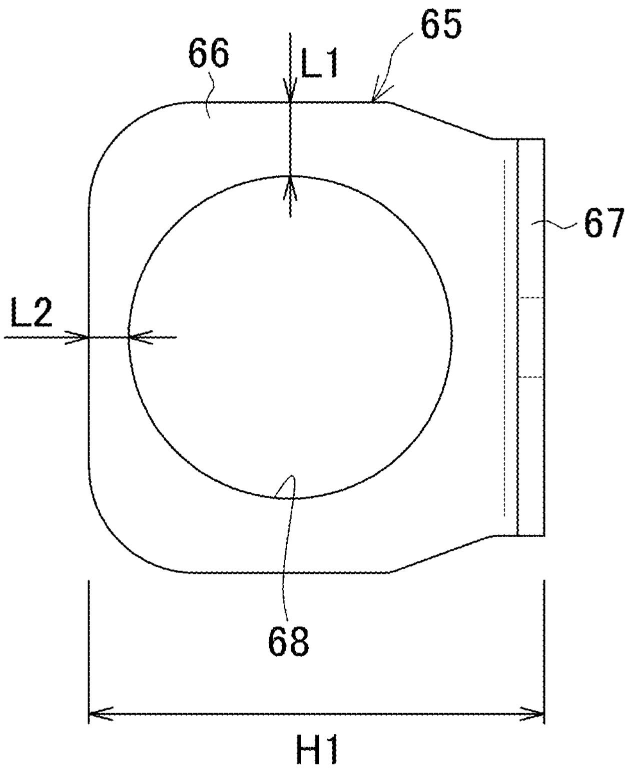
FIG. 8A is an explanatory view of a sheet metal member in side view.
Figure 8C:
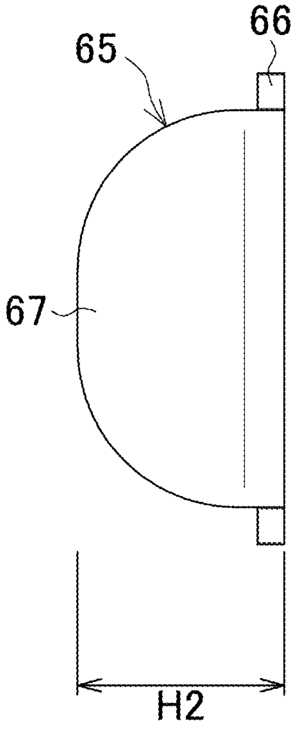
FIG. 8C is an explanatory view of the sheet metal member in back view.

Between the rod coupling portions 60, 60 and the rod 58, a pair of sheet metal members 65, 65 having mutually same shapes are interposed. As illustrated in FIGS. 8A to 8C, the sheet metal member 65 is an L-shaped sheet metal including an inner plate portion 66 and an outer plate portion 67. The inner plate portion 66 has an approximately quadrangular shape in side view, which is approximately the same shape as an inner surface of the rod coupling portion 60 and smaller than it. The inner plate portion 66 is provided with a circular hole 68 having a diameter same as that of the through-hole 62 of the rod coupling portion 60. The circular hole 68 is formed at the center in the up-down direction of the inner plate portion 66 and biased to the front side. Accordingly, an up-down width L1 of the inner plate portion 66 lying in the upper side with respect to the uppermost position of the circular hole 68 is larger than a front-rear width L2 of the inner plate portion 66 lying in the front side with respect to the frontmost position of the circular hole 68.

The outer plate portions 67 are formed by bending the sheet metal members 65, 65 from rear ends of the inner plate portions 66 along rear faces of the rod coupling portions 60 in mutually opposite left and right outsides. The outer plate portion 67 has an approximately semicircular shape smaller than the rear face of the rod coupling portion 60. The outer plate portion 67 has a left-right width H2 smaller than a front-rear width H1 of the inner plate portion 66. While a left-right width H3 of the groove 61 illustrated in FIG. 7 is greater than the left-right width H2 of the outer plate portion 67, a difference between the left-right width H3 and the left-right width H2 is equal to or less than a left-right thickness of the inner plate portion 66.

When the rod 58 is coupled to the rod coupling portions 60, 60, first, the pair of sheet metal members 65, 65 are put in the posture having the outer plate portions 67, 67 each facing outside. Then, the inner plate portions 66, 66 are inserted into the groove 61, and the outer plate portions 67, 67 are brought in contact with the rear surfaces of the rod coupling portions 60, 60. Thus, the inner plate portion 66 contacts the inner surface of the rod coupling portion 60, and each of the sheet metal members 65 is positioned at a position at which the circular hole 68 is concentric with the through-hole 62.

At this time, since the sheet metal members 65, 65 have the same shape, any of the left and right sheet metal members 65, 65 can be assembled. Even when one sheet metal member 65 is assembled such that the outer plate portion 67 is inverted in the left-right direction and the outer plate portion 67 enters the groove 61, since a clearance generated by the difference between the left-right width H2 of the outer plate portion 67 and the left-right width H3 of the groove 61 is equal to or less than the thickness of the inner plate portion 66, the other sheet metal member 65 cannot be assemble in the state. Therefore, an operator can immediately obtain a misassembly.

Figure 9:
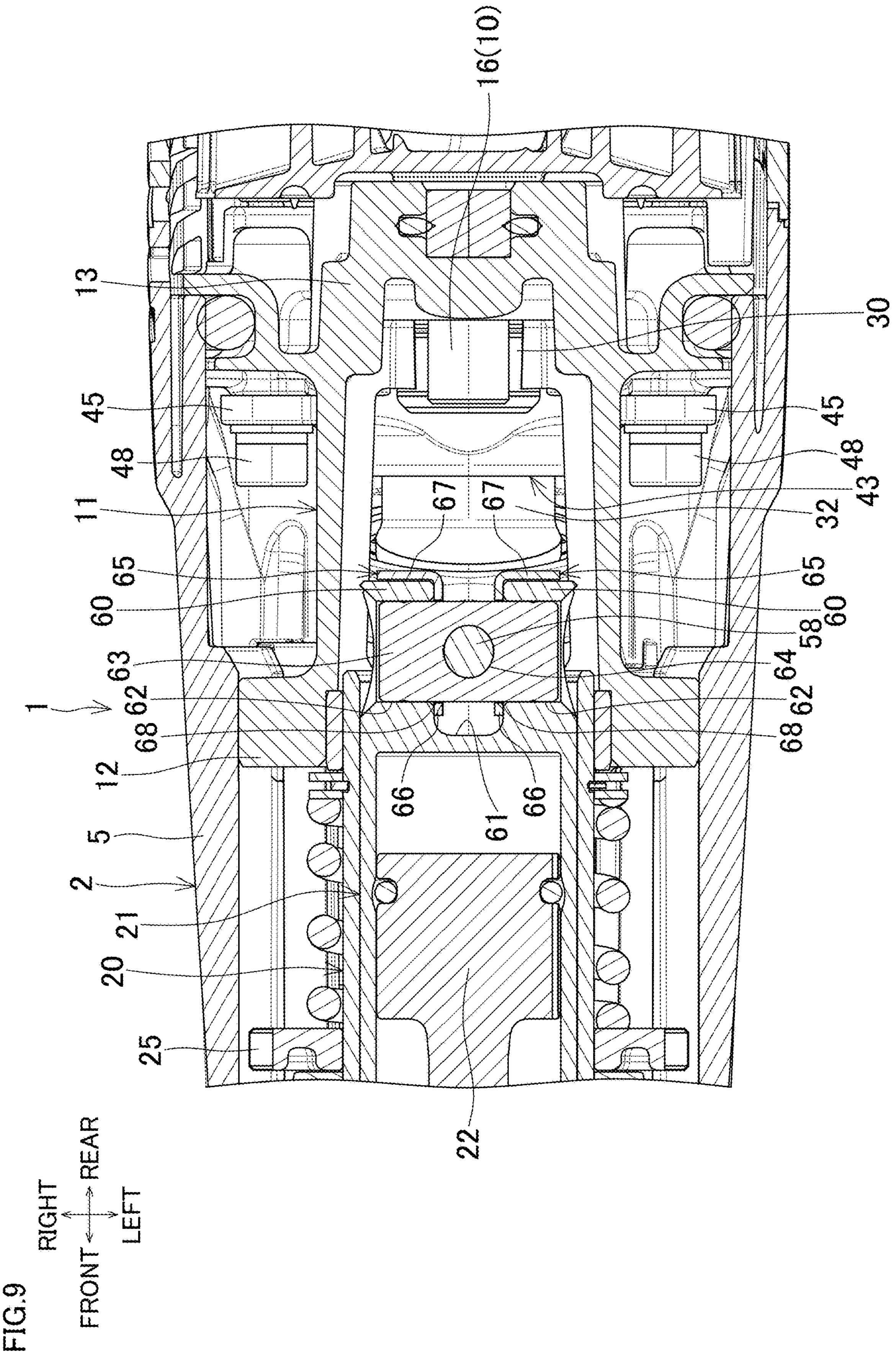
FIG. 9 is an enlarged cross-sectional view taken along a line D-D of FIG. 1.

In this state, the coupling pin 63 is passed through the through-holes 62 of the respective rod coupling portions 60 and the circular holes 68 of the respective sheet metal members 65 in the left-right direction. Thus, the coupling hole 64 of the coupling pin 63 is positioned between the left and right inner plate portions 66, 66 in the groove 61. Accordingly, by making the rod 58 penetrate the coupling hole 64 passing between the left and right inner plate portions 66, 66, coupling the rod coupling portions 60, 60 to the rod 58 is completed as illustrated in FIG. 7 and FIG. 9.

As illustrated in FIG. 1, FIG. 4, and FIG. 6, the intermediate shaft 31 includes an intermediate-diameter portion 70 and a small-diameter portion 71 ahead of the spline 41, and the outer diameter of the intermediate shaft 31 decreases step by step toward the front side. The small-diameter portion 71 is supported by the front bearing 40.

The output gear 33 is externally mounted to the intermediate-diameter portion 70 ahead of the spline 41 so as to be coaxial and rotatable. In a front portion of the output gear 33, external teeth 72 meshed with the gear 25 disposed at the tool holder 20 are provided. On a rear outer periphery of the output gear 33, a gear side engaging portion 73 including a plurality of external teeth in a circumferential direction is formed.

A sleeve 74 is externally mounted to the small-diameter portion 71 between the output gear 33 and the front bearing 40. The sleeve 74 is press-fitted to the small-diameter portion 71, and integrally secured with the small-diameter portion 71. The sleeve 74 has an outer diameter smaller than a tooth bottom diameter of the external tooth 72 of the output gear 33 and larger than a diameter of the intermediate-diameter portion 70. The sleeve 74 abuts on an inner race 40*a* of the front bearing 40 and a front side end surface of the intermediate-diameter portion 70 in the secured state, and is close to a front end surface of the output gear 33. Accordingly, the output gear 33 is restricted from moving in the front-rear direction between the spline 41 and the sleeve 74.

The first clutch 34 and the second clutch 35 are splined to the spline 41. The first and second clutches 34, 35 have sleeve shapes, and are movable back and forth with respect to the spline 41 and integrally rotatable with the spline 41. On an inner periphery in the front side of the first clutch 34, a front engaging portion 75 including a plurality of internal teeth in a circumferential direction is formed. The front engaging portion 75 is engaged with the gear side engaging portion 73 of the output gear 33 at an advance position of the first clutch 34, and released from the gear side engaging portion 73 at a retreated position of the first clutch 34. At an outer periphery of a rear portion of the first clutch 34, a ring-shaped front locking groove 76 is provided.

On an inner periphery in the rear side of the second clutch 35, a rear engaging portion 77 including a plurality of internal teeth in a circumferential direction is formed. The rear engaging portion 77 is engaged with the boss side engaging portion 42 of the boss sleeve 32 at a retreated position, and released from the boss side engaging portion 42 at an advance position. At an outer periphery of a front portion of the second clutch 35, a ring-shaped rear locking groove 78 is provided.

Figure 10:
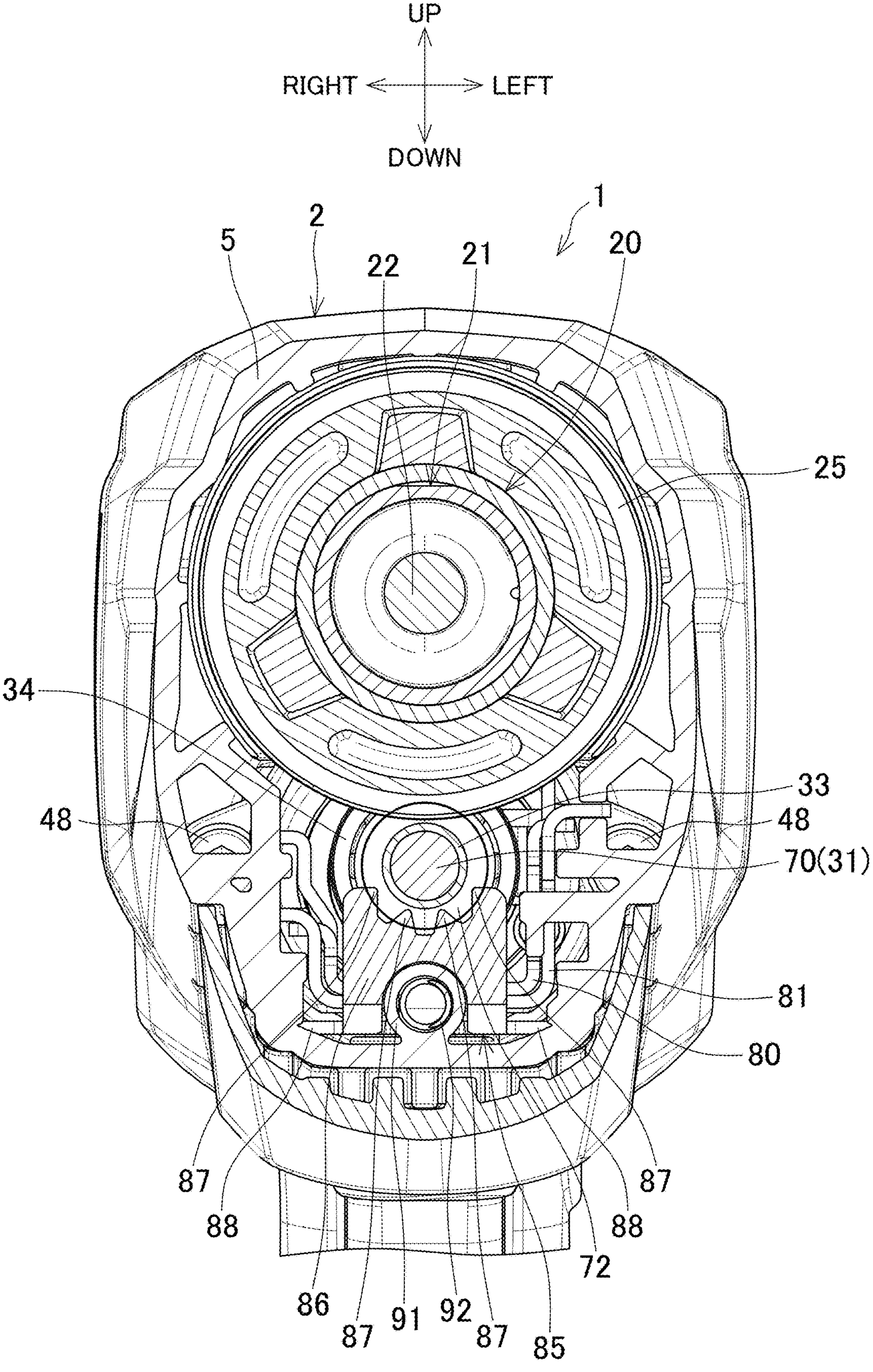
FIG. 10 is an enlarged cross-sectional view taken along a line E-E of FIG. 1.

Below the intermediate shaft 31, a first switch plate 80 and a second switch plate 81 are disposed. The first and second switch plates 80, 81 are plate bodies overlapped in the up-down direction and extending in the front-rear direction. The first switch plate 80 includes a first locking piece 82 bent in the right side from a rear end, and the first locking piece 82 is locked to the front locking groove 76 of the first clutch 34. The second switch plate 81 is overlapped with the first switch plate 80 in the lower side, and includes a second locking piece 83 bent in the right side. The second locking piece 83 is locked to the rear locking groove 78 of the second clutch 35. As illustrated in FIG. 10, both left and right sides of the first and second switch plates 80, 81 are supported to be slidable back and forth by the inner surface of the rear cylinder portion 5. Accordingly, the first clutch 34 moves in the front-rear direction integrally with the first switch plate 80, and the second clutch 35 moves in the front-rear direction integrally with the second switch plate 81. A coil spring 84 is disposed between the first and second switch plates 80, 81. Accordingly, the first switch plate 80 is biased forward, and the second switch plate 81 is biased rearward.

Below the first and second switch plates 80, 81, a lock plate 85 is disposed. The lock plate 85 is a plate body extending on a plane in the front-rear and left-right directions, and a lock piece 86 bent upward is formed at a front end of the lock plate 85. The lock piece 86 is located at a rear of the front bearing 40, and a plurality of locking claws 87 are formed at an upper end of the lock piece 86. As illustrated in FIG. 10, the number (here, four) of the locking claws 87 to be formed is ⅓ or more of the number (here, nine) of the external teeth 72 of the output gear 33, and the locking claws 87 are configured to be meshed with the external teeth 72 from the lower side.

At both left and right ends of the lock plate 85, a pair of protruding portions 88, 88 protruding in left and right outsides with respect to the lock piece 86 are provided. As illustrated in FIG. 7, the protruding portions 88, 88 are supported by a pair of left and right guiding portions 89, 89 disposed in the front-rear direction at the inner surface of the rear cylinder portion 5. Accordingly, the lock plate 85 is slidable in the front-rear direction. In the lock plate 85, the locking claws 87 of the lock piece 86 are meshed with the external teeth 72 of the output gear 33 at a retreated lock position, and the lock piece 86 is separated forward from the external teeth 72 at an advanced lock release position.

At a rear of the lock piece 86, the lock plate 85 is cut and raised upward to form a spring receiving piece 90. Ahead of the spring receiving piece 90, a cylindrical spring holder 91 is disposed to protrude facing rearward on the front side inner surface of the rear cylinder portion 5. The spring holder 91 holds a front portion of a coil spring 92. The coil spring 92 has a rear end in contact with the spring receiving piece 90, thereby biasing the lock plate 85 to a lock position.

Front-rear positions of the respective first and second switch plates 80, 81 and lock plate 85 can be changed by a switching knob 95. The switching knob 95 is disposed at the lower surface of the rear cylinder portion 5 so as to be rotatable in operation. The switching knob 95 includes a cam portion 96 projecting inside the rear cylinder portion 5. At an eccentric position from a rotational center of the switching knob 95 in a top surface of the cam portion 96, an eccentric pin 97 projecting upward is disposed. The eccentric pin 97 passes through a rear of the second switch plate 81 and penetrates the first switch plate 80 from the lower side. Accordingly, the first switch plate 80 biased forward is restricted from moving forward by the eccentric pin 97, and retreats in accordance with the eccentric pin 97 moving rearward. As illustrated in FIG. 2, the second switch plate 81 biased rearward is in contact with the front holder 12 of the inner housing 11, restricted from retreating, and moves forward when the rear end is pressed in accordance with the move of the eccentric pin 97 to the front side.

The lock plate 85 biased rearward is in contact with the cam portion 96, and restricted from retreating.

Accordingly, by performing a rotation operation of the switching knob 95, the front-rear positions of the first and second switch plates 80, 81 can be changed via the eccentric pin 97, and the front-rear position of the lock plate 85 can be changed via the cam portion 96. Specifically, by changing each of the front-rear positions of the first clutch 34, the second clutch 35, and the lock plate 85, each of the operation modes of a hammer mode, neutral, a hammer drill mode, and a drill mode can be selected.

The following describes each of the operation modes.

First, the switching knob 95 is turned to the hammer mode. Then, as illustrated in FIG. 1, the first clutch 34 comes to the retreated position and separates from the output gear 33. Accordingly, the rotation of the intermediate shaft 31 transmitted from the pinion 16 via the input gear 30 is not transmitted to the output gear 33.

Meanwhile, the second clutch 35 comes to the retreated position and engages with the boss sleeve 32. Accordingly, the rotation of the intermediate shaft 31 is transmitted to the boss sleeve 32 via the second clutch 35.

The lock plate 85 comes to the lock position as illustrated in FIG. 2. Accordingly, the locking claws 87 of the retreated lock piece 86 meshes with the external teeth 72 of the output gear 33 to lock the rotation of the output gear 33.

When a push-in operation of the trigger is performed to turn ON the switch in this state, the motor 9 is driven to rotate the rotation shaft 10. Then, the boss sleeve 32 rotates together with the intermediate shaft 31 to swing the rod 58 back and forth together with the outer ring 57 via the swash bearing 55. Accordingly, the piston cylinder 21 coupled to the rod 58 via the coupling pin 63 reciprocates. Therefore, the striker 22 reciprocates to strike the bit B via the impact bolt 23.

When the rod 58 swings back and forth, the inner plate portions 66, 66 of the sheet metal members 65, 65 positioned at left and right of the rod 58 are slidably in contact with the rod 58 to guide the swing of the rod 58. At this time, since the inner plate portions 66, 66 have the quadrangular shape approximately the same as the inner surfaces of the rod coupling portions 60, 60, the swing of the rod 58 can be guided with large receiving surfaces. Especially, since the up-down width L1 in the upper side of the circular hole 68 is larger than the front-rear width L2 in the front side of the circular hole 68, the slide of the upper end of the rod 58 projecting upward from the coupling pin 63 can be reliably received by the inner plate portions 66, 66.

In the hammer mode, since the rotation of the output gear 33 is locked by the lock plate 85, the rotations of the output gear 33 and the gear 25 are also locked, and the tool holder 20 does not rotate. Especially, as illustrated in FIG. 1 and FIG. 10, the locking claws 87 of the lock plate 85 mesh with the external teeth 72 of the output gear 33 below the gear 25 across the output gear 33, and overlap with the gear 25 in a radial direction of the gear 25. That is, the locking claws 87 are fitted within the thickness of the gear 25 extended downward without being displaced from the gear 25 in the front-rear direction in side view. Accordingly, the inclination of the output gear 33 can be restricted against a force applied to incline the intermediate shaft 31 downward while the meshing with the output gear 33 is maintained. Therefore, burnout between the rotating intermediate shaft 31 and the locked output gear 33 is less likely to be generated.

Here, when an angle around an axis of the bit B is to be changed, the motor 9 is stopped, and the switching knob 95 is turned to a neutral position. Then, similarly to the hammer drill mode illustrated in FIG. 11 and the drill mode illustrated in FIG. 12, the cam portion 96 moving forward advances the lock plate 85 to the lock release position, thus separating the locking claws 87 from the output gear 33. Accordingly, the tool holder 20 becomes freely rotatable together with the output gear 33, and the bit B can be adjusted to any angle around the axis. By turning the switching knob 95 to the hammer mode again, the cam portion 96 moving rearward retreats the lock plate 85 to the lock position, thus locking the rotation of the tool holder 20 via the output gear 33 and the gear 25.

At this time, since the locking claws 87 engage with and disengage from the external teeth 72 of the output gear 33 by moving back and forth, a space for moving the lock plate 85 back and forth in the outside in the radial direction of the output gear 33 is compact.

Figure 11:
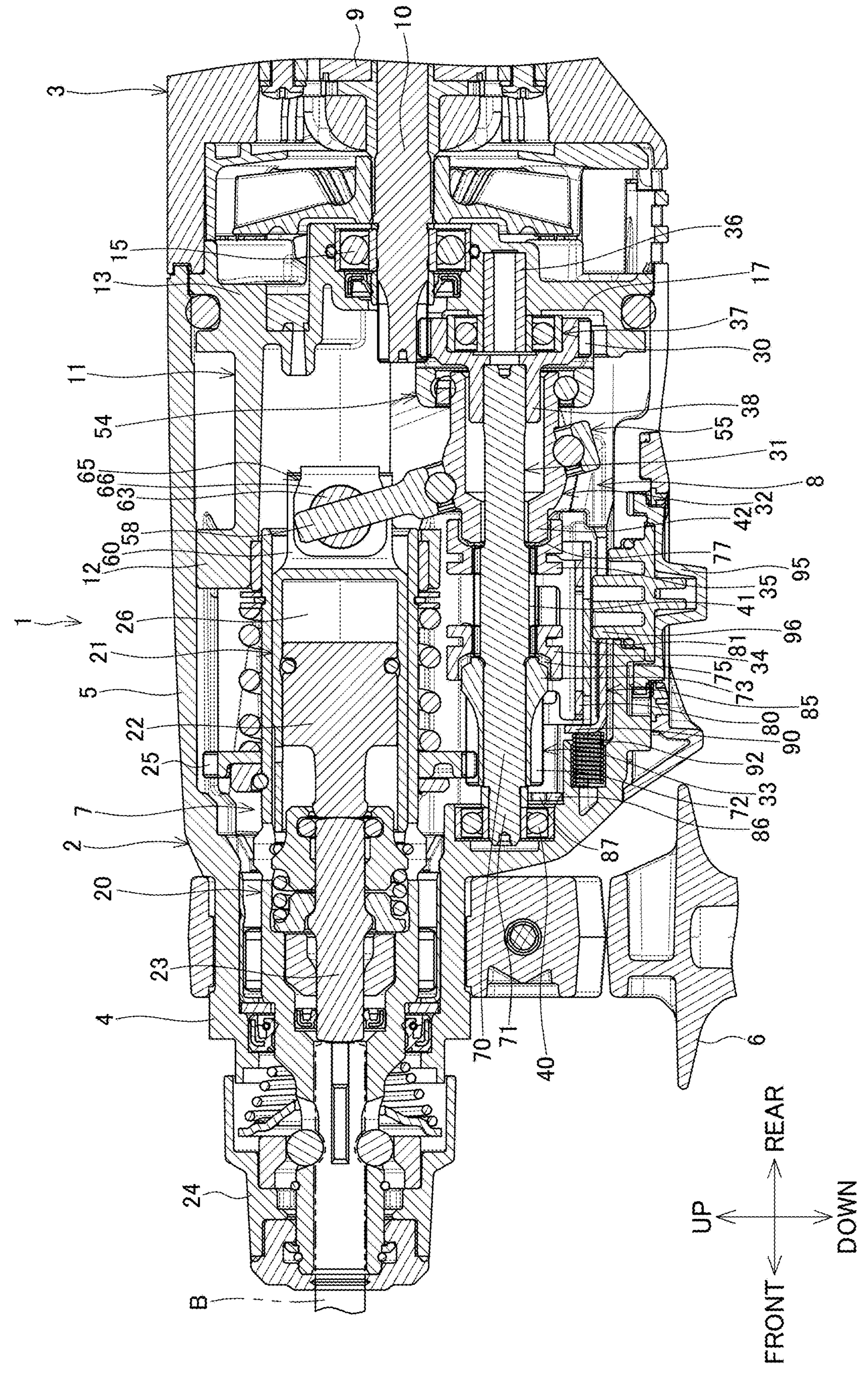
FIG. 11 is a center vertical cross-sectional view of a part of the hammer drill (hammer drill mode).

Next, the switching knob 95 is turned to the hammer drill mode. Then, as illustrated in FIG. 11, the first clutch 34 comes to the advance position due to the eccentric pin 97 moving forward, and engages with the output gear 33. Accordingly, the rotation of the intermediate shaft 31 is transmitted from the first clutch 34 to the output gear 33.

Meanwhile, the second clutch 35 stays at the retreated position. Accordingly, the rotation of the intermediate shaft 31 is transmitted from the second clutch 35 to the boss sleeve 32.

The lock plate 85 comes to the lock release position, and separates the locking claws 87 from the output gear 33.

When the push-in operation of the trigger is performed and the motor 9 is driven in this state, the tool holder 20 rotates via the intermediate shaft 31, the output gear 33, and the gear 25, thus rotating the bit B at the distal end.

Simultaneously, the boss sleeve 32 rotates to swing the rod 58 back and forth, thus reciprocating the piston cylinder 21 back and forth. Accordingly, the associated striker 22 strikes the bit B via the impact bolt 23.

Figure 12:
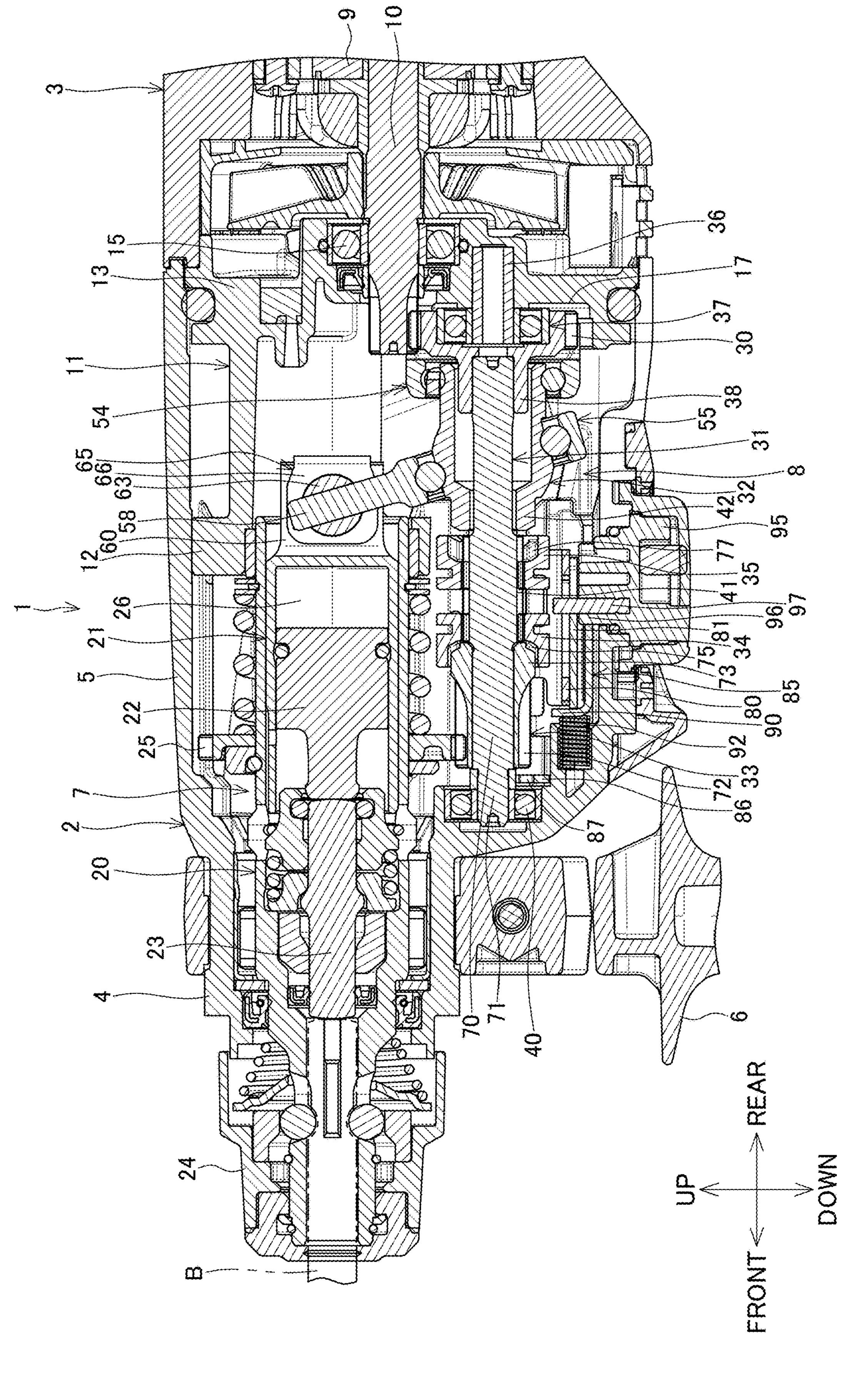
FIG. 12 is a center vertical cross-sectional view of a part of the hammer drill (drill mode).

Next, the switching knob 95 is turned to the drill mode. Then, as illustrated in FIG. 12, the first clutch 34 stays at the advance position.

Meanwhile, the second clutch 35 comes to the advance position due to the eccentric pin 97 moving forward, and separates from the boss sleeve 32. Accordingly, the rotation of the intermediate shaft 31 is not transmitted to the boss sleeve 32.

The lock plate 85 stays at the lock release position.

When the push-in operation of the trigger is performed and the motor 9 is driven in this state, the tool holder 20 rotates via the intermediate shaft 31, the output gear 33, and the gear 25, thus rotating the bit B at the distal end. Since the boss sleeve 32 does not rotate, an impact operation does not occur.

At this time, since the boss sleeve 32 is cantilevered to the support ring 43 via the bearing 54 and not in contact with the intermediate shaft 31, a friction is not generated between the outer peripheral surface of the rotating intermediate shaft 31 and the inner peripheral surface of the boss sleeve 32. Accordingly, occurrence of an unexpected impact operation in the drill mode can be reliably avoided.

The disclosure according to the cantilever support of the boss sleeve provides the following effects.

In the hammer drill 1 of the above-described embodiment, the cylindrical tool holder 20 is rotatably and pivotally supported in the front housing 2 (an example of a housing), the tool holder 20 extends in the front-rear direction and has the front end to which the bit B is attachable, the tool holder 20 houses the piston cylinder 21 to be movable back and forth, and the striker 22 (an example of an impactor) configured to strike the bit B is disposed inside the piston cylinder 21.

In the rear housing 3 (an example of a housing), the motor 9 is disposed, and the intermediate shaft 31 to which the rotation is transmitted from the rotation shaft 10 of the motor 9 is pivotally supported to be parallel to the axis line of the tool holder 20. The boss sleeve 32 (an example of a sleeve-shaped impact transmission member) is rotatably and externally mounted to the intermediate shaft 31 separately from the intermediate shaft 31. The boss sleeve 32 includes the rod 58 coupled to the rear end of the piston cylinder 21 via the swash bearing 55 (an example of a swing member). The swash bearing 55 is configured to swing back and forth in accordance with the rotation of the intermediate shaft 31. The boss sleeve 32 is configured to rotate to convert the rotation of the intermediate shaft 31 into the reciprocating motion in the front-rear direction of the rod 58 and transmit the reciprocating motion to the piston cylinder 21. The intermediate shaft 31 is provided with the second clutch 35 (an example of a clutch member) configured to be integrally rotatable with the intermediate shaft 31 and slidable in the front-rear direction.

The hammer drill 1 is configured to select the hammer mode in which the second clutch 35 engages with the boss sleeve 32 to reciprocate the piston cylinder 21 back and forth and the drill mode (an example of another operation mode) in which the second clutch 35 separates from the boss sleeve 32 by performing the switch operation of the slide position of the second clutch 35 from the outside of the front housing 2.

Further, the boss sleeve 32 is rotatably cantilevered not to be in contact with the intermediate shaft 31 by the inner housing 11 (an example of a housing) via the bearing 54.

With the configuration, an unexpected impacting motion in the drill mode in which the second clutch 35 does not engage with the boss sleeve 32 can be effectively suppressed.

The bearing 54 is disposed at a rear of the swash bearing 55, and includes the inner race portion 50 (an example of an inner race), the outer race portion 44 (an example of an outer race), and the balls 53 (an example of a rolling body) between the inner race portion 50 and outer race portion 44. The outer race portion 44 is supported by the inner housing 11.

Accordingly, the cantilever support of the boss sleeve 32 by the inner housing 11 is facilitated.

The inner race portion 50 is integrally formed with the boss sleeve 32.

Accordingly, a rational configuration in which the inner race portion 50 doubles as the boss sleeve 32 is provided, and the number of components can be reduced even when the bearing 54 is disposed.

The intermediate shaft 31 is pivotally supported by the front bearing 40 and the rear bearing 37 held by the front housing 2 and the inner housing 11 at a front and a rear of the swash bearing 55.

Accordingly, the intermediate shaft 31 can be accurately supported to be parallel to the tool holder 20.

The intermediate shaft 31 includes the input gear 30 meshed with the pinion 16 disposed at the rotation shaft 10 and supported by the rear bearing 37. The input gear 30 and the rear bearing 37 are located on an identical plane perpendicular to the axis line of the intermediate shaft 31.

Accordingly, the positions of the input gear 30 and the rear bearing 37 are same in the front-rear direction, and the input gear 30 and the rear bearing 37 are compactly arranged in the front-rear direction.

The outer race portion 44 is supported by the inner housing 11 via the support ring 43 (an example of a support member) assembled to the inner housing 11. The support ring 43 includes the spigot joint portion 46 (an example of a positioning portion) coupled to the inner housing 11 by spigot joint. The spigot joint portion 46 is also located on the plane identical to the input gear 30 and the rear bearing 37.

Accordingly, even when the support ring 43 that cantilevers the boss sleeve 32 is provided, downsizing in the front-rear direction can be maintained.

The rear bearing 37 includes the inner race 37*a*, the outer race 37*b*, and the balls 37*c* (an example of a rolling body) between the inner race 37*a* and the outer race 37*b*. The inner race 37*a* of the rear bearing 37 is supported by the inner housing 11.

Accordingly, even when the rear bearing 37 is disposed on a plane identical to the input gear 30, the inner housing 11 can support the rear bearing 37.

The inner race 37*a* of the rear bearing 37 is supported by the inner housing 11 via the pin 36 (an example of a pin member) press-fitted to the inner housing 11.

Accordingly, the rear bearing 37 inside the input gear 30 can be easily assembled to the inner housing 11.

The intermediate shaft 31 is coupled to the input gear 30 in the radially inside of the boss sleeve 32.

Accordingly, the intermediate shaft 31 can be coupled to the input gear 30 without the interference with the bearing 54 that cantilevers the boss sleeve 32.

The boss side engaging portion 42 (an example of an engaging portion) engaged with the second clutch 35 is disposed in the front end outside of the boss sleeve 32.

Accordingly, the boss sleeve 32 can be engaged with and disengaged from the second clutch 35 without an obstacle even when the boss sleeve 32 is cantilevered.

The disclosure according to the cantilever support of the boss sleeve can be changed as follows.

While the outer race of the bearing is integrated with the support ring, and the inner race is integrated with the boss sleeve in the above-described embodiment, any one or both of the outer race and the inner race may be disposed separately from the support ring or the boss sleeve.

The bearing is not limited to a ball bearing. As the bearing, another bearing, such as a needle bearing, may be used. Also as the rear bearing, a bearing other than the ball bearing can be used.

The rear bearing and the input gear may be disposed to be displaced in a front and a rear in the axial direction instead of disposing them on the identical plane. In this case, for example, the rear bearing disposed at the rear end of the intermediate shaft may be held by the inner housing, and the input gear disposed ahead of the rear bearing may be meshed with the pinion.

The number of the clutch members may be one.

For the output switching unit, even when two intermediate shafts are provided to be parallel, one intermediate shaft is for impact transmission including an impact transmission member, and the other intermediate shaft is for rotation transmission including an output gear, the disclosure can be applied to the one intermediate shaft.

In the disclosure, the hammer mode and another operation mode other than the hammer mode may be selectable. The other operation mode may be a drill mode.

In the disclosure, the sheet metal member that receives the rod is not limited to the member having the L shape in plan view in the above-described embodiment. One member having a U shape in plan view may be used, and two washers may be used.

In the disclosure, instead of meshing the lock plate with the external teeth of the output gear, the lock plate may be locked to locking teeth provided separately from the external teeth of the output gear to lock the rotation of the output gear.

The disclosure according to the sheet metal member provides the following effects.

In the hammer drill 1 of the above-described embodiment, the cylindrical tool holder 20 is rotatably and pivotally supported in the front housing 2, the tool holder 20 extends in the front-rear direction and has the front end to which the bit B is attachable, the tool holder 20 houses the piston cylinder 21 to be movable back and forth, and the striker 22 configured to strike the bit B is disposed inside the piston cylinder 21.

In the rear housing 3, the motor 9 is disposed, and the intermediate shaft 31 to which the rotation is transmitted from the rotation shaft 10 of the motor 9 is pivotally supported to be parallel to the axis line of the tool holder 20.

The boss sleeve 32 is externally mounted to the intermediate shaft 31. The boss sleeve 32 includes the rod 58 coupled to the rear end of the piston cylinder 21 via the swash bearing 55 (an example of a swing member). The swash bearing 55 is configured to swing back and forth in accordance with the rotation of the intermediate shaft 31. The boss sleeve 32 is configured to rotate to convert the rotation of the intermediate shaft 31 into the reciprocating motion in the front-rear direction of the rod 58 and transmit the reciprocating motion to the piston cylinder 21. By transmitting the rotation of the intermediate shaft 31 to the boss sleeve 32, the piston cylinder 21 reciprocates back and forth, thus enabling the striker 22 to strike the bit B.

Then, the rod 58 is coupled to the rear end of the piston cylinder 21 using the coupling pin 63 in the state where the distal end of the rod 58 is inserted into the groove 61 provided in the up-down direction between the pair of left and right rod coupling portions 60, 60 that project rearward. The coupling pin 63 penetrates the respective rod coupling portions 60 and the rod 58 in the left-right direction. Further, the pair of sheet metal members 65, 65 through which the coupling pin 63 penetrates are interposed between the left and right inner surfaces of the groove 61 and the rod 58. Each of the sheet metal members 65 has an L shape in plan view including the inner plate portion 66 that covers the inner surface of the groove 61 and the outer plate portion 67 that is bent from the rear end of the inner plate portion 66 and covers the rear end surface of the rod coupling portion 60.

With the configuration, the sheet metal member 65 is provided with the satisfactory assemblability and surely provided with the required receiving surface without the influence of the dimensional change during molding, and it can be intended to avoid abrasion of the rod coupling portion 60 using the sheet metal member 65.

Each of the inner plate portions 66 has a quadrangular outer shape in side view.

Accordingly, the receiving surface of the rod 58 can be ensured to be large.

Each of the inner plate portions 66 is provided with the circular hole 68 through which the coupling pin 63 penetrates, and the up-down width L1 of the inner plate portion 66 lying in the upper side with respect to the uppermost position of the circular hole 68 is larger than the front-rear width L2 of the inner plate portion 66 lying in the front side with respect to the frontmost position of the circular hole 68.

Accordingly, the receiving surface of the rod 58 projecting upward from the coupling pin 63 can be ensured, and the slide of the upper end of the rod 58 can be reliably received by the inner plate portion 66.

The rod coupling portions 60 form a circular shape in back view, and the groove 61 is formed at the center in the left-right direction thereof. Each of the outer plate portions 67 has a semicircular outer shape in back view.

Accordingly, even when the outer plate portion 67 is provided, the outer plate portion 67 does not protrude from the rear surface of the rod coupling portion 60.

The width H2 in the left-right direction of the outer plate portion 67 is smaller than the width H1 in the front-rear direction of the inner plate portion 66.

Accordingly, the direction in the assembly is easily obtained, and a misassembly does not occur.

The sheet metal members 65 have the same shape.

Accordingly, the sheet metal members 65 can be assembled without worrying about left or right. The manufacturing cost and the management labor can be reduced.

The difference between the width H3 in the left-right direction of the groove 61 and the width H2 in the left-right direction of the outer plate portion 67 is equal to or less than the thickness of the inner plate portion 66.

Accordingly, the mistake in the direction of assembling the inner plate portion 66 and the outer plate portion 67 does not occur.

The disclosure according to the sheet metal member can be changed as follows.

The shape in side view of the inner plate portion is not limited to the quadrangular shape. The shape in side view may be a polygonal shape and a circular shape.

The up-down width of the inner plate portion in the upper side with respect to the circular hole may be same as the front-rear width of the inner plate portion in the front side with respect to the circular hole.

The outer shape of the outer plate portion does not need to be a semicircular shape in back view. The outer shape in back view may be a quadrangular shape, a trapezoidal shape, and the like insofar as the outer plate portion does not protrude from the rear surface of the rod coupling portion.

The width in the front-rear direction of the inner plate portion may be same as the width in the left-right direction of the outer plate portion, and can be changed as necessary according to the shape of the rod coupling portion.

The width in the left-right direction of the outer plate portion may be larger than the width in the left-right direction of the groove.

The sheet metal members do not need to have the same shape.

For the output switching unit, even when two intermediate shafts are provided to be parallel, one intermediate shaft is for impact transmission including an impact transmission member, and the other intermediate shaft is for rotation transmission including an output gear, the disclosure can be applied insofar as a rod provided to the impact transmission member is configured to be coupled to a piston cylinder.

In the above-described embodiment, in addition to the hammer mode, the hammer drill mode and the drill mode are selectable as another operation mode. However, the other operation mode may be the drill mode alone.

The disclosure can be applied even to an electric hammer dedicated to impact.

In the disclosure, the boss sleeve does not need to be cantilevered by the inner housing.

In the disclosure, instead of meshing the lock plate with the external teeth of the output gear, the lock plate may be locked to locking teeth provided separately from the external teeth of the output gear to lock the rotation of the output gear.

The disclosure according to the locking member of the output gear provides the following effects.

In the hammer drill 1 of the above-described embodiment, the cylindrical tool holder 20 is rotatably and pivotally supported in the front housing 2, the tool holder 20 extends in the front-rear direction and has the front end to which the bit B is attachable, the tool holder 20 houses the piston cylinder 21 to be movable back and forth, and the striker 22 configured to strike the bit B is disposed inside the piston cylinder 21.

In the rear housing 3, the motor 9 is disposed, and the intermediate shaft 31 to which the rotation is transmitted from the rotation shaft 10 of the motor 9 is pivotally supported to be parallel to the axis line of the tool holder 20.

The output gear 33 and the boss sleeve 32 are rotatably and externally mounted to the intermediate shaft 31 each separately from the intermediate shaft 31. The output gear 33 meshes with the gear 25 disposed at the tool holder 20, and is restricted from moving in the axial direction of the intermediate shaft 31. The boss sleeve 32 includes the rod 58 coupled to the rear end of the piston cylinder 21. The boss sleeve 32 is configured to rotate to convert the rotation of the intermediate shaft 31 into the reciprocating motion in the front-rear direction of the rod 58 and transmit the reciprocating motion to the piston cylinder 21. Between the output gear 33 and boss sleeve 32, the first and second clutches 34, 35 configured to be integrally rotatable with the intermediate shaft 31 and slidable in the front-rear direction are disposed. By performing the switch operation of the slide positions of the first and second clutches 34, 35 from the outside of the front housing 2, the hammer mode, the drill mode, and the hammer drill mode can be selected.

The lock plate 85 (an example of a locking member) is disposed in the front housing 2. The lock plate 85 is configured to slide in the front-rear direction, and locks the rotation of the output gear 33 at the lock position at which the lock plate 85 is locked to the output gear 33 in the hammer mode. By performing the switch operation of the lock plate 85 from the outside of the front housing 2, the lock release position at which the lock plate 85 separates from the output gear 33 can be selected.

Then, the lock plate 85 includes locking claws 87 configured to directly mesh with the external teeth 72 of the output gear 33, and at the lock position, the locking claws 87 mesh with the external teeth 72 at a position opposed to the gear 25 across the output gear 33 in front view.

With the configuration, with the lock plate 85 that is opposed to the gear 25 and directly meshes with the external teeth 72 of the output gear 33 at the lock position, the inclination of the output gear 33 can be reduced to avoid the burnout in the hammer mode. Additionally, the lock plate 85 can be provided in a saved space.

The locking claw 87 has the thickness in the front-rear direction entirely overlapping with the gear 25 in the radial direction of the gear 25 at the lock position.

Accordingly, it is possible to effectively counter the force of inclining the output gear 33 in the opposed side of the gear 25, and the configuration is effective to avoid the burnout of the output gear 33.

The output gear 33 is restricted from moving in the axial direction by the sleeve 74 (an example of a retaining member) provided to the intermediate shaft 31, and the sleeve 74 does not interfere with the lock plate 85 moving from the lock position to the lock release position.

Accordingly, the move of the output gear 33 can be restricted without the interference with the lock plate 85.

The retaining member is the sleeve 74 having the diameter smaller than the diameter of the tooth bottom of the external tooth 72 of the output gear 33.

Accordingly, the interference with the lock plate 85 directly meshing with the external teeth 72 can be reliably avoided.

The sleeve 74 is press-fitted into the intermediate shaft 31 and secured.

Accordingly, the sleeve 74 can be easily secured.

The intermediate shaft 31 is provided with the intermediate-diameter portion 70 (an example of a position regulating portion) that abuts on the sleeve 74 to regulate the position of the sleeve 74.

Accordingly, the contact between the sleeve 74 and the output gear 33 can be easily avoided using the intermediate-diameter portion 70 of the intermediate shaft 31.

The lock plate 85 is provided with the protruding portion 88 (an example of a sliding portion) guided by the guiding portion 89 provided to the front housing 2 when moving back and forth.

Accordingly, the lock plate 85 smoothly moves back and forth to the lock position and the lock release position.

The lock plate 85 is biased to the lock position by the coil spring 92 (an example of a spring member) provided between the front housing 2 and the lock plate 85, and the spring receiving piece 90 (an example of a spring receiving portion) that receives the coil spring 92 is disposed in the rear side with respect to the locking claw 87.

Accordingly, the lock plate 85 can be configured to be compact in the axial direction to allow the arrangement of the lock plate 85 in the front-rear direction in a saved space.

The spring receiving piece 90 is located in the outside with respect to the locking claw 87 in the radial direction of the output gear 33.

Accordingly, the coil spring 92 can be disposed without the interference with the locking claw 87, and even when the coil spring 92 is provided, the lock plate 85 can be provided in the radial direction in a saved space.

The locking claws 87 can mesh with ⅓ or more of the number of the external teeth 72 of the output gear 33.

Accordingly, the rotation of the output gear 33 can be reliably locked.

The disclosure according to the locking member of the output gear can be changed as follows.

In the above-described embodiment, the locking claws mesh with the external teeth directly below the center of the gear and the center of the output gear. However, the locking claws may be meshed with the external teeth in a region of a lower half of the external teeth with respect to the center of the output gear as a boundary. Since a position in the region of the lower half is opposed to the gear, the action of suppressing the inclination of the output gear can be provided.

However, the gear and the output gear are not necessarily arranged in the up-down direction in front view. The output gear may be arranged to be biased to any one side of left and right with respect to the gear in front view. Also in this case, it is only necessary to mesh the locking claws to the external teeth in a region in an opposite side when the region of the external teeth in front view is divided into two of a gear side and the opposite side having the center of the output gear as a boundary.

The number of the locking claws meshed with the external teeth of the output gear may be larger than that in the above-described embodiment. However, insofar as the locking claws are opposed to the gear and the inclination of the output gear is suppressed, the number of the meshed locking claws may be smaller than that in the above-described embodiment.

While the locking claws have the thickness in the front-rear direction entirely overlapping with the gear in the radial direction of the gear at the lock position in the above-described embodiment, the thickness in the front-rear direction of the locking claws may partially overlap with the gear.

The retaining member of the output gear does not need to be a sleeve. Insofar as the interference with the locking member can be avoided, another member, such as a C-ring, may be used as the retaining member.

In the disclosure, the boss sleeve does not need to be cantilevered by the inner housing.

In the disclosure, the sheet metal member that receives the rod is not limited to a member having an L shape in plan view of the above-described embodiment. One member having a U shape in plan view may be used, and two washers may be used.

In the disclosure, the impact operation may be performed by a piston that reciprocates in a secured cylinder instead of the piston cylinder.

In the above-described embodiment, in addition to the hammer mode, the hammer drill mode and the drill mode are selectable. However, only any of the hammer drill mode and the drill mode may be selectable.

The following describes modification examples common in the respective disclosures.

The position of the switching knob also can be changed as necessary.

The number of the clutch members is not limited to two. One clutch member may be slid to select the respective operation modes.

For the impact output, the striker may directly strike the bit without the impact bolt.

The housing is not limited to one including the front housing, the rear housing, and the inner housing. For example, the housing may be a cylindrical one in which a front housing and a rear housing are integrated, or one formed by assembling left and right half housings.

The motor is not limited to one having the rotation shaft facing forward. The motor may have the rotation shaft facing upward or facing obliquely upward.

The power source may be a battery pack attached to the housing instead of a commercial power supply.

From the above-described contents according to the sheet metal member, the following disclosures of an impact tool can be extracted.

(A1) An impact tool that includes: a housing; a cylindrical tool holder pivotally supported to be rotatable in the housing, the tool holder extending in a front-rear direction and having a front end to which a bit is attachable; a piston cylinder housed to be movable back and forth in the tool holder; an impactor configured to strike the bit and disposed inside the piston cylinder; a motor disposed in the housing; an intermediate shaft pivotally supported to be parallel to an axis line of the tool holder in the housing, a rotation of the motor being transmitted to the intermediate shaft from a rotation shaft of the motor; and an impact transmission member externally mounted to the intermediate shaft, the impact transmission member including a rod coupled to a rear end of the piston cylinder via a swing member that swings back and forth in accordance with a rotation of the intermediate shaft, the impact transmission member being configured to rotate to convert the rotation of the intermediate shaft into a reciprocating motion in the front-rear direction of the rod and transmit the reciprocating motion to the piston cylinder. By transmitting the rotation of the intermediate shaft to the impact transmission member, the piston cylinder reciprocates back and forth to enable the impactor to strike the bit. The rod is coupled to the rear end of the piston cylinder using a coupling pin in a state where a distal end of the rod is inserted into a groove provided in an up-down direction between a pair of left and right rod coupling portions that project rearward. The coupling pin penetrates the respective rod coupling portions and the rod in a left-right direction. A pair of sheet metal members through which the coupling pin penetrates are interposed between left and right inner surfaces of the groove and the rod. Each of the sheet metal members has an L shape in plan view including an inner plate portion that covers the inner surface of the groove and an outer plate portion that is bent from a rear end of the inner plate portion and covers a rear end surface of the rod coupling portion.

(A2) The impact tool according to (A1) in which each of the inner plate portions has a quadrangular outer shape in side view.

(A3) The impact tool according to (A2) in which each of the inner plate portions is provided with a circular hole through which the coupling pin penetrates, and an up-down width of the inner plate portion lying in an upper side with respect to an uppermost position of the circular hole is larger than a front-rear width of the inner plate portion lying in a front side with respect to a frontmost position of the circular hole.

(A4) The impact tool according to (A2) or (A3) in which the rod coupling portions form a circular shape in back view, the groove is formed at a center in the left-right direction thereof, and each of the outer plate portions has an approximately semicircular outer shape in back view.

(A5) The impact tool according to any of (A1) to (A4) in which a width in the left-right direction of the outer plate portion is smaller than a width in the front-rear direction of the inner plate portion.

(A6) The impact tool according to any of (A1) to (A5) in which the sheet metal members have an identical shape.

(A7) The impact tool according to any of (A1) to (A6) in which a difference between a width in the left-right direction of the groove and the width in the left-right direction of the outer plate portion is equal to or less than a thickness of the inner plate portion.

(A8) The impact tool according to any of (A1) to (A7) in which the intermediate shaft is provided with a clutch member configured to be integrally rotatable with the intermediate shaft and slidable in the front-rear direction. The impact transmission member is rotatably and externally mounted to the intermediate shaft, and by performing a switch operation of a slide position of the clutch member from an outside of the housing, a hammer mode in which the clutch member is engaged with the impact transmission member to reciprocate the piston cylinder back and forth and another operation mode in which the clutch member is not engaged with the impact transmission member are selectable. The impact transmission member is rotatably cantilevered not to be in contact with the intermediate shaft by the housing via a bearing, and does not corotate with the intermediate shaft that rotates in the other operation mode.

From the above-described contents according to the lock of the output gear, the following disclosures of a hammer drill can be extracted.

(B1) A hammer drill that includes: a housing; a cylindrical tool holder pivotally supported to be rotatable in the housing, the tool holder extending in a front-rear direction and having a front end to which a bit is attachable; a piston cylinder housed to be movable back and forth in the tool holder; an impactor configured to strike the bit and disposed inside the piston cylinder; a motor disposed in the housing; an intermediate shaft pivotally supported to be parallel to an axis line of the tool holder in the housing, a rotation of the motor being transmitted to the intermediate shaft from a rotation shaft of the motor; a gear disposed at the tool holder; an output gear that meshes with the gear to be restricted from moving in an axial direction of the intermediate shaft, the output gear being rotatably and externally mounted to the intermediate shaft separately from the intermediate shaft; an impact transmission member including a rod coupled to a rear end of the piston cylinder, the impact transmission member being configured to rotate to convert a rotation of the intermediate shaft into a reciprocating motion in the front-rear direction of the rod and transmit the reciprocating motion to the piston cylinder, the impact transmission member rotatably and externally mounted to the intermediate shaft separately from the intermediate shaft; and a clutch member disposed between the gear and the impact transmission member, the clutch member being configured to be integrally rotatable with the intermediate shaft and slidable in the front-rear direction. By performing a switch operation of a slide position of the clutch member from an outside of the front housing, a hammer mode in which the clutch member is engaged with only the impact transmission member to reciprocate the piston cylinder back and forth, and a drill mode and/or a hammer drill mode in which the clutch member is engaged with at least the output gear to rotate the tool holder are selectable. A locking member is disposed in the housing. The locking member is configured to slide in the front-rear direction, and locks the rotation of the output gear at a lock position at which the locking member is locked to the output gear in the hammer mode. By performing a switch operation of the locking member from the outside of the housing, a lock release position at which the locking member separates from the output gear is selectable. The locking member includes locking claws configured to directly mesh with external teeth of the output gear, and at the lock position, the locking claws mesh with the external teeth at a position opposed to the gear across the output gear in front view.

(B2) The hammer drill according to (B1) in which the locking claw has a thickness in the front-rear direction at least partially overlapping with the gear in a radial direction of the gear at the lock position.

(B3) The hammer drill according to (B1) or (B2) in which the output gear is restricted from moving in the axial direction by a retaining member provided to the intermediate shaft, and the retaining member does not interfere with the locking member moving from the lock position to the lock release position.

(B4) The hammer drill according to (B3) in which the retaining member is a sleeve having diameter smaller than a diameter of a tooth bottom of the external tooth of the output gear.

(B5) The hammer drill according to (B4) in which the sleeve is press-fitted into the intermediate shaft and secured.

(B6) The hammer drill according to (B4) or (B5) in which the intermediate shaft is provided with a position regulating portion that abuts on the sleeve to regulate a position of the sleeve.

(B7) The hammer drill according to any of (B1) to (B6) in which the locking member is provided with a sliding portion guided by a guiding portion provided to the housing when moving back and forth.

(B8) The hammer drill according to any of (B1) to (B7) in which the locking member is biased to the lock position by a spring member provided between the housing and the locking member, and a spring receiving portion that receives the spring member is disposed in a rear side with respect to the locking claw.

(B9) The hammer drill according to (B8) in which the spring receiving portion is located in an outside with respect to the locking claw in a radial direction of the output gear.

(B10) The hammer drill according to any of (B1) to (B9) in which the locking claws are configured to mesh with ⅓ or more of the number of the external teeth of the output gear.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An electric power tool comprising:

a housing;

a cylindrical tool holder pivotally supported to be rotatable in the housing, the tool holder extending in a front-rear direction and having a front end to which a bit is attachable;

a piston cylinder housed to be movable back and forth in the tool holder;

an impactor configured to strike the bit and disposed inside the piston cylinder;

a motor disposed in the housing;

at least one intermediate shaft pivotally supported to be parallel to an axis line of the tool holder in the housing, a rotation of the motor being transmitted to the intermediate shaft from a rotation shaft of the motor;

a sleeve-shaped impact transmission member including a rod coupled to a rear end of the piston cylinder via a swing member that swings back and forth in accordance with a rotation of the intermediate shaft, the impact transmission member being configured to rotate to convert the rotation of the intermediate shaft into a reciprocating motion in the front-rear direction of the rod and transmit the reciprocating motion to the piston cylinder, the impact transmission member rotatably and externally mounted to the intermediate shaft separately from the intermediate shaft; and a clutch member disposed at the intermediate shaft, the clutch member being configured to be integrally rotatable with the intermediate shaft and slidable in the front-rear direction, wherein by performing a switch operation of a slide position of the clutch member from an outside of the housing, a hammer mode in which the clutch member is engaged with the impact transmission member to reciprocate the piston cylinder back and forth and another operation mode in which the clutch member separates from the impact transmission member are selectable, and the impact transmission member is rotatably cantilevered not to be in contact with the intermediate shaft by the housing via a bearing.

2. The electric power tool according to claim 1, wherein the bearing is disposed at a rear of the swing member and includes an inner race, an outer race, and a rolling body between the inner race and the outer race, and the outer race is supported by the housing.

3. The electric power tool according to claim 2, wherein the inner race is integrally formed with the impact transmission member.

4. The electric power tool according to claim 2, wherein the intermediate shaft is pivotally supported by a front bearing and a rear bearing held by the housing at a front and a rear of the swing member.

5. The electric power tool according to claim 4, wherein the intermediate shaft includes an input gear meshed with a pinion disposed at the rotation shaft and supported by the rear bearing, and the input gear and the rear bearing are located on an identical plane perpendicular to an axis line of the intermediate shaft.

6. The electric power tool according to claim 5, wherein the outer race is supported by the housing via a support member assembled to the housing, the support member includes a positioning portion coupled to the housing by spigot joint, and the positioning portion is also located on the identical plane.

7. The electric power tool according to claim 6, wherein the housing includes a front holder that supports the tool holder and a rear holder that supports the rotation shaft extending in the front-rear direction in a manner in which the rotation shaft perpendicularly penetrates through the rear holder, and the support member is assembled to a front surface of the rear holder.

8. The electric power tool according to claim 7, wherein the support member has a ring shape integrated with the outer race.

9. The electric power tool according to claim 8, wherein a circular depressed portion is provided at the front surface of the rear holder, the rear bearing and the input gear are disposed in the circular depressed portion, and the support member is assembled to the front surface of the rear holder coaxially with the circular depressed portion.

10. The electric power tool according to claim 5, wherein the rear bearing includes an inner race, an outer race, and a rolling body between the inner race and the outer race, and the inner race of the rear bearing is supported by the housing.

11. The electric power tool according to claim 10, wherein the inner race of the rear bearing is supported by the housing via a pin member press-fitted to the housing.

12. The electric power tool according to claim 11, wherein the input gear has a cap shape having an opening in the rear side, external teeth are provided on an outer periphery of the input gear and meshed with the pinion, the outer race is supported by the input gear in the opening, and the inner race is supported by the pin member coaxially disposed in the opening.

13. The electric power tool according to claim 5, wherein the intermediate shaft is coupled to the input gear in a radially inside of the impact transmission member.

14. The electric power tool according to claim 13, wherein a receiving cylinder portion is coaxially formed to face forward at a front surface of the input gear, and a rear end of the intermediate shaft is press-fitted to the receiving cylinder portion to couple the intermediate shaft to the input gear.

15. The electric power tool according to claim 14, wherein the receiving cylinder portion and the rear end of the intermediate shaft overlap with the bearing in the radial direction of the impact transmission member.

16. The electric power tool according to claim 1, wherein an engaging portion engaged with the clutch member is disposed in a front end outside of the impact transmission member.

* * * * *